(12) United States Patent
Morikawa et al.

(10) Patent No.: US 10,227,430 B2
(45) Date of Patent: Mar. 12, 2019

(54) METHOD FOR PRODUCING AQUEOUS PERFLUOROELASTOMER DISPERSION, AND METHOD FOR PRODUCING PERFLUOROELASTOMER

(71) Applicant: DAIKIN INDUSTRIES, LTD., Osaka-shi, Osaka (JP)

(72) Inventors: Tatsuya Morikawa, Osaka (JP); Junpei Terada, Osaka (JP); Shoji Fukuoka, Decatur, AL (US)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/117,275

(22) PCT Filed: Feb. 16, 2015

(86) PCT No.: PCT/JP2015/054106
§ 371 (c)(1),
(2) Date: Aug. 8, 2016

(87) PCT Pub. No.: WO2015/125726
PCT Pub. Date: Aug. 27, 2015

(65) Prior Publication Data
US 2016/0347895 A1    Dec. 1, 2016

(30) Foreign Application Priority Data

Feb. 18, 2014   (JP) ................ 2014-028863

(51) Int. Cl.
| | | |
|---|---|---|
| C08F 2/26 | (2006.01) | |
| C08F 214/26 | (2006.01) | |
| C08F 216/14 | (2006.01) | |
| C08F 14/18 | (2006.01) | |
| C08F 2/24 | (2006.01) | |

(52) U.S. Cl.
CPC ............ C08F 214/262 (2013.01); C08F 2/24 (2013.01); C08F 2/26 (2013.01); C08F 14/18 (2013.01); C08F 216/1408 (2013.01)

(58) Field of Classification Search
CPC .......... C08F 214/262; C08F 2/24; C08F 2/26; C08F 14/18; C08F 216/1408
USPC ......................................................... 524/777
See application file for complete search history.

(56) References Cited

U.S. PATENT DOCUMENTS

| | | | | |
|---|---|---|---|---|
| 6,395,848 | B1 * | 5/2002 | Morgan ................. | C08F 14/26 523/203 |
| 7,049,380 | B1 * | 5/2006 | Chang .................. | C08F 214/18 526/206 |
| 7,705,074 | B2 * | 4/2010 | Brothers ................ | C08F 14/18 524/130 |
| 2003/0125421 | A1 * | 7/2003 | Bladel ...................... | C08F 6/16 523/310 |
| 2009/0036604 | A1 | 2/2009 | Kishine et al. | |
| 2010/0029878 | A1 | 2/2010 | Matsuoka et al. | |
| 2010/0204345 | A1 | 8/2010 | Yamanaka et al. | |

FOREIGN PATENT DOCUMENTS

| | | |
|---|---|---|
| CN | 1239483 A | 12/1999 |
| CN | 101357964 A | 2/2009 |
| CN | 101772520 A | 7/2010 |
| JP | 2006-321797 A | 11/2006 |
| JP | 2009-52034 A | 3/2009 |
| JP | 2009-155558 A | 7/2009 |
| JP | 2009155558 A * | 7/2009 |
| WO | 98/20055 A1 | 5/1998 |
| WO | 2008/132959 A1 | 11/2008 |

* cited by examiner

*Primary Examiner* — Kelechi C Egwim
(74) *Attorney, Agent, or Firm* — Sughrue Mion, PLLC

(57) ABSTRACT

An aqueous perfluoroelastomer dispersion and method for producing a perfluoroelastomer using a specific fluorosurfactant and capable of achieving a sufficient number of particles and a sufficient polymerization rate. The method includes providing an aqueous dispersion containing perfluoroelastomer particles by emulsion-polymerizing a perfluoromonomer in an aqueous medium in the presence of a specific fluorosurfactant in an amount of 2 parts by mass or more for 100 parts by mass of the aqueous medium.

3 Claims, No Drawings

METHOD FOR PRODUCING AQUEOUS PERFLUOROELASTOMER DISPERSION, AND METHOD FOR PRODUCING PERFLUOROELASTOMER

CROSS REFERENCE TO RELATED APPLICATIONS

This application is a National Stage of International Application No. PCT/JP2015/054106 filed Feb. 16, 2015, claiming priority based on Japanese Patent Application No. 2014-028863 filed Feb. 18, 2014, the contents of all of which are incorporated herein by reference in their entirety.

TECHNICAL FIELD

The present invention relates to methods for producing aqueous perfluoroelastomer dispersions and methods for producing perfluoroelastomers.

BACKGROUND ART

There are known methods of producing non-perfluoroelastomers or aqueous fluororesin dispersions by emulsion polymerization using perfluorohexanoic acid ($C_5F_{11}COOH$) or a salt thereof.

Patent Literature 1 discloses a method for producing a fluoroelastomer including emulsion-copolymerizing vinylidene fluoride and a fluoroolefin monomer other than the vinylidene fluoride in the presence of an emulsifier represented by $C_5F_{11}COOM$, wherein M is H, $NH_4$, or an alkali metal.

Patent Literature 2 discloses that a tetrafluoroethylene/propylene copolymer latex is produced by emulsion polymerization using $CF_3(CF_2)_4COO^-(NH_4)^+$ as an emulsifier (see Reference Example 5).

Patent Literature 3 discloses a method for producing a fluoropolymer including emulsion-polymerizing a fluoromonomer in the presence of a polymerization catalyst in an aqueous medium containing a fluorocarboxylic acid compound, wherein the aqueous medium during the polymerization has a pH of at most 4. The examples of this document disclose that tetrafluoroethylene is emulsion-polymerized in the presence of $C_5F_{11}COOH$ to provide a polytetrafluoroethylene aqueous emulsion.

CITATION LIST

Patent Literature

Patent Literature 1: JP 2009-52034 A
Patent Literature 2: JP 2006-321797 A
Patent Literature 3: WO 2008/132959

SUMMARY OF INVENTION

Technical Problem

In contrast, no method is known for producing an aqueous perfluoroelastomer dispersion using a fluorosurfactant represented by the following formula (1):

$$X-(CF_2)_{m1}-Y \quad (1)$$

wherein X is H or F; m1 is an integer of 3 to 6; and Y is $-SO_3M$, $-SO_4M$, $-SO_3R$, $-SO_4R$, $-COOM$, $-PO_3M_2$, or $-PO_4M_2$ (where M is H, $NH_4$, or an alkali metal; and R is a C1-C12 alkyl group).

The present invention aims to provide a method for producing an aqueous perfluoroelastomer dispersion and a method for producing a perfluoroelastomer using a fluorosurfactant represented by the above formula (1) and capable of achieving a sufficient number of particles and a sufficient polymerization rate.

Solution to Problem

The inventors found that, in production of aqueous perfluoroelastomer dispersions, emulsion polymerization of a perfluoromonomer in the presence of a specific concentration of the fluorosurfactant represented by the above formula (1) enables a sufficient number of particles and a sufficient polymerization rate even without a fluorosurfactant (e.g., perfluorooctanoic acid or a salt thereof) conventionally used in production of aqueous perfluoroelastomer dispersions, and thereby completed the present invention.

Specifically, the present invention relates to a method for producing an aqueous perfluoroelastomer dispersion including providing an aqueous dispersion containing perfluoroelastomer particles by emulsion-polymerizing a perfluoromonomer in an aqueous medium in the presence of a fluorosurfactant in an amount of 2 parts by mass or more for 100 parts by mass of the aqueous medium and represented by the following formula (1):

$$X-(CF_2)_{m1}-Y \quad (1)$$

wherein X is H or F; m1 is an integer of 3 to 6; and Y is $-SO_3M$, $-SO_4M$, $-SO_3R$, $-SO_4R$, $-COOM$, $-PO_3M_2$, or $-PO_4M_2$, where M is H, $NH_4$, or an alkali metal; and R is a C1-C12 alkyl group.

The perfluoroelastomer constituting the perfluoroelastomer particles is preferably at least one selected from the group consisting of a copolymer of tetrafluoroethylene and a fluoromonomer represented by the following formula (3) and a copolymer of tetrafluoroethylene, a fluoromonomer represented by the following formula (3), and a monomer that gives a crosslinking site.

$$CF_2=CF(O(CF_2)_{n31})_{m31}(OCF_2)_{x31}(OCF_2CF(CF_3))_{y31}ORf^{31} \quad (3)$$

wherein n31 is an integer of 1 to 6; m31 is an integer of 0 to 4; x31 is an integer of 0 to 6; y31 is an integer of 0 to 4; $Rf^{31}$ is a C1-C8 linear or branched perfluoroalkyl group, a C5-C6 cyclic perfluoroalkyl group, or a C2-C6 linear or branched perfluorooxyalkyl group having 1 to 3 oxygen atoms.

The perfluoroelastomer constituting the perfluoroelastomer particles is more preferably at least one selected from the group consisting of a copolymer of TFE and a fluoromonomer represented by the following formula (8), (10), or (11) and a copolymer of TFE, a fluoromonomer represented by the following formula (8), (10), or (11), and a monomer that gives a crosslinking site.

$$CF_2=CF-ORf^{81} \quad (8)$$

wherein $Rf^{81}$ is a C1-C8 perfluoroalkyl group.

$$CF_2=CFOCF_2ORf^{101} \quad (10)$$

wherein $Rf^{101}$ is a C1-C6 linear or branched perfluoroalkyl group, a C5-C6 cyclic perfluoroalkyl group, or a C2-C6 linear or branched perfluorooxyalkyl group having 1 to 3 oxygen atoms.

$$CF_2=CFO(CF_2CF(Y^{11})O)_m(CF_2)_nF \quad (11)$$

wherein $Y^{11}$ is a fluorine atom or a trifluoromethyl group; m is an integer of 1 to 4; and n is an integer of 1 to 4.

The aqueous dispersion containing perfluoroelastomer particles preferably contains $5 \times 10^{14}$ or more perfluoroelastomer particles per cc.

The present invention also relates to a method for producing a perfluoroelastomer including providing a perfluoroelastomer by removing the aqueous medium from the aqueous dispersion containing perfluoroelastomer particles obtained by the above production method.

Advantageous Effects of Invention

The method for producing an aqueous perfluoroelastomer dispersion of the present invention enables a sufficient number of particles and a sufficient polymerization rate even without a conventional fluorosurfactant such as perfluorooctanoic acid or a salt thereof.

DESCRIPTION OF EMBODIMENTS

The present invention will be specifically described hereinbelow.

The method for producing an aqueous perfluoroelastomer dispersion of the present invention includes providing an aqueous dispersion containing perfluoroelastomer particles by emulsion-polymerizing a perfluoromonomer in an aqueous medium in the presence of a specific fluorosurfactant in an amount of 2 parts by mass or more for 100 parts by mass of the aqueous medium.

The fluorosurfactant used in the above method is a fluorosurfactant represented by the following formula (1):

$$X-(CF_2)_{m1}-Y \qquad (1)$$

wherein X is H or F; m1 is an integer of 3 to 6; and Y is $-SO_3M$, $-SO_4M$, $-SO_3R$, $-SO_4R$, $-COOM$, $-PO_3M_2$, or $-PO_4M_2$, where M is H, $NH_4$, or an alkali metal; and R is a C1-C12 alkyl group.

Y in the above formula (1) is preferably $-COOM$.

For easily removal from the resulting perfluoroelastomer, M in the above formula (1) is preferably $NH_4$ or H, more preferably $NH_4$.

Preferably, m1 in the above formula (1) is an integer of 3 to 5.

The fluorosurfactant is preferably a compound represented by the following formula (1-1):

$$C_5F_{11}COOM \qquad (1-1)$$

(wherein M is H, $NH_4$, or an alkali metal), i.e., perfluorohexanoic acid or a salt thereof. For easy removal from the resulting perfluoroelastomer, M is preferably $NH_4$ or H, more preferably $NH_4$.

The fluorosurfactant represented by the formula (1) (hereinafter, also referred to as a fluorosurfactant (1)) is advantageously easily removed from the perfluoroelastomer in comparison with other fluorosurfactants. In the case of fluororesin, the fluorosurfactant can be easily removed by washing. In contrast, since the fluoroelastomer is obtained as a coagulated mass, the fluorosurfactant is contained in the mass. Thus, in the case of a fluoroelastomer, the fluorosurfactant is difficult to remove by washing. As a result, the fluorosurfactant in this case is usually removed by heating, especially heat-drying in vacuo. Surprisingly, the fluorosurfactant (1) is found to be easily removed from the perfluoroelastomer by heating in comparison with perfluorooctanoic acid or a salt thereof used in conventional production of aqueous perfluoroelastomer dispersions. The finding that the fluorosurfactant (1) is more easily removed by heating than other fluorosurfactants was first found by the present inventors.

In the emulsion polymerization in the production method of the present invention, 2 parts by mass or more of the fluorosurfactant (1) is used for 100 parts by mass of the aqueous medium. Use of the fluorosurfactant (1) at a concentration within the above range enables a sufficient number of particles and a sufficient polymerization rate even without a conventional fluorosurfactant such as perfluorooctanoic acid or a salt thereof. Further, such use of the fluorosurfactant (1) can also increase the viscosity of the resulting perfluoroelastomer. Too small an amount of the fluorosurfactant (1) may fail to achieve a sufficient number of particles and a sufficient polymerization rate, and may also cause too low a viscosity of the resulting perfluoroelastomer. Even if a large amount of a conventional fluorosurfactant such as perfluorooctanoic acid or a salt thereof is used, the polymerization rate and the number of particles show no change or only a slight change. The lower limit of the amount of the fluorosurfactant (1) in the emulsion polymerization is preferably 4 parts by mass, more preferably 6 parts by mass, still more preferably 9 parts by mass, for 100 parts by mass of the aqueous medium. The upper limit may be any value. Still, too large an amount of the fluorosurfactant may fail to give the effects that balance the amount and may be uneconomical. Thus, the upper limit thereof is preferably 100 parts by mass, more preferably 70 parts by mass, still more preferably 50 parts by mass, particularly preferably 25 parts by mass, for 100 parts by mass of the aqueous medium.

In the production method of the present invention, an aqueous dispersion containing perfluoroelastomer particles is produced by emulsion-polymerizing a perfluoromonomer.

The perfluoromonomer herein means a monomer that has no carbon-hydrogen bond in the molecule. The perfluoromonomer may be a monomer which includes a carbon atom(s) and fluorine atoms and in which some fluorine atoms bonding to the carbon atom(s) are replaced by chlorine atoms, or may include not only a carbon atom(s) but also a nitrogen atom(s), an oxygen atom(s), and a sulfur atom(s). The perfluoromonomer is preferably a monomer in which all the hydrogen atoms are replaced by fluorine atoms. The perfluoromonomer also preferably includes an oxygen atom(s). The perfluoromonomer is particularly preferably a monomer consisting only of a carbon atom(s) and a fluorine atom(s) and/or a monomer consisting only of a carbon atom(s), a fluorine atom(s), and an oxygen atom(s). The perfluoromonomer does not include a monomer that gives a crosslinking site.

The perfluoroelastomer herein means a fluoropolymer including 90 mol % or more of a perfluoromonomer unit in all the polymerized units, having a glass transition temperature of 20° C. or lower, having a melting peak (ΔH) of 4.5 J/g or lower or no melting peak, and having a fluorine atom concentration in the fluoropolymer of 71 mass % or more. The fluorine atom concentration in the fluoropolymer herein is a concentration (mass %) of the fluorine atoms in the fluoropolymer calculated based on the types and amounts of the monomers constituting the fluoropolymer.

The perfluoromonomer is preferably at least one selected from the group consisting of tetrafluoroethylene (TFE), hexafluoropropylene (HFP), and a fluoromonomer represented by the following formula (3):

$$CF_2=CF(O(CF_2)_{n31})_{m31}(OCF_2)_{x31}(OCF_2CF(CF_3))_{y31}ORf^{31} \qquad (3)$$

wherein n31 is an integer of 1 to 6; m31 is an integer of 0 to 4; x31 is an integer of 0 to 6; y31 is an integer of 0 to 4; and $Rf^{31}$ is a C1-C8 linear or branched perfluoroalkyl group, a C5-C6 cyclic perfluoroalkyl group, or a C2-C6 linear or branched perfluorooxyalkyl group having 1 to 3 oxygen atoms.

The fluoromonomer represented by the formula (3) is preferably at least one selected from the group consisting of perfluoro(methyl vinyl ether) (PMVE), perfluoro(ethyl vinyl ether), perfluoro(propyl vinyl ether), $CF_2\!=\!CFOCF_2OCF_3$, $CF_2\!=\!CFOCF_2OCF_2CF_3$, $CF_2\!=\!CFOCF_2OCF_2CF_2OCF_3$, $CF_2\!=\!CFOCF_2CF(CF_3)O(CF_2)_3F$, $CF_2\!=\!CFO(CF_2CF(CF_3)O)_2(CF_2)_3F$, $CF_2\!=\!CFO(CF_2CF(CF_3)O)_3(CF_2)_2F$, $CF_2\!=\!CFOCF_2CF_2OCF_3F$, $CF_2\!=\!CFOCF_2CF_2CF_2OCF_3$, $CF_2\!=\!CFO(CF_2CF_2CF_2O)_2CF_3$, $CF_2\!=\!CFO(CF_2CF_2CF_2O)_3CF_3$, $CF_2\!=\!CFOCF_2CF_2OCF_2CF_3$, $CF_2\!=\!CF_2CF_2CF_2O)_2CF_2CF_2CF_3$, $CF_2\!=\!CFO(CF_2CF_2CF_2O)_3CF_2CF_2CF_3$, $CF_2\!=\!CFOCF_2CF_2CF_2OCF_3$, $CF_2\!=\!CFOCF_2CF_2OCF_2CF_3$, $CF_2\!=\!CFOCF_2CF_2CF_2OCF_3$, $CF_2\!=\!CFOCF_2CF_2CF_2CF_2OCF_3$, $CF_2\!=\!CFOCF_2CF_2OCF_2OCF_3$, $CF_2\!=\!CFOCF_2CF_2OCF_2CF_2OCF_3$, $CF_2\!=\!CFOCF_2OCF_2CF_2OCF_3$, $CF_2\!=\!CFOCF_2CF_2OCF_2CF_2CF_2OCF_3$, $CF_2\!=\!CFOCF_2CF_2OCF_2CF_2CF_2CF_2OCF_3$, $CF_2\!=\!CFOCF_2CF_2OCF_2CF_2CF_2CF_3$, $CF_2\!=\!CFOCF_2CF_2(OCF_2)_3OCF_3$, $CF_2\!=\!CFOCF_2CF_2(OCF_2)_4OCF_3$, $CF_2\!=\!CFOCF_2CF_2OCF_2OCF_3$, $CF_2\!=\!CFOCF_2CF_2OCF_2CF_2CF_3$, and $CF_2\!=\!CFOCF_2CF_2OCF_2CF_2OCF_2CF_2CF_3$.

The perfluoromonomer is more preferably at least one selected from the group consisting of
tetrafluoroethylene (TFE),
hexafluoropropylene (HFP),
a fluoromonomer represented by the formula (8):

$$CF_2\!=\!CF\!-\!ORf^{81} \quad (8)$$

(wherein $Rf^{81}$ is a C1-C8 perfluoroalkyl group),
a fluoromonomer represented by the formula (10):

$$CF_2\!=\!CFOCF_2ORf^{101} \quad (10)$$

(wherein $Rf^{101}$ is a C1-C6 linear or branched perfluoroalkyl group, a C5-C6 cyclic perfluoroalkyl group, or a C2-C6 linear or branched perfluorooxyalkyl group having 1 to 3 oxygen atoms), and
a fluoromonomer represented by the formula (11):

$$CF_2\!=\!CFO(CF_2CF(Y^{11})O)_m(CF_2)_nF \quad (11)$$

(wherein $Y^{11}$ is a fluorine atom or a trifluoromethyl group; m is an integer of 1 to 4; and n is an integer of 1 to 4).

The fluoromonomer represented by the formula (8) is preferably at least one selected from the group consisting of perfluoro(methyl vinyl ether) (PMVE), perfluoro(ethyl vinyl ether), and perfluoro(propyl vinyl ether), more preferably perfluoro(methyl vinyl ether).

The fluoromonomer represented by the formula (10) is preferably at least one selected from the group consisting of $CF_2\!=\!CFOCF_2OCF_3$, $CF_2\!=\!CFOCF_2OCF_2CF_3$, and $CF_2\!=\!CFOCF_2OCF_2CF_2OCF_3$.

The fluoromonomer represented by the formula (11) is preferably at least one selected from the group consisting of $CF_2\!=\!CFOCF_2CF(CF_3)O(CF_2)_3F$, $CF_2\!=\!CFO(CF_2CF(CF_3)O)_2(CF_2)_3F$, and $CF_2\!=\!CFO(CF_2CF(CF_3)O)_3(CF_2)_2F$.

The perfluoroelastomer particles may also be produced by polymerizing a perfluoromonomer and a monomer that gives a crosslinking site. The monomer that gives a crosslinking site is a monomer (cure-site monomer) having a crosslinkable group that provides the fluoropolymer with a crosslinkable site for forming a crosslink by a curing agent.

The monomer that gives a crosslinking site is preferably at least one selected from the group consisting of
a fluoromonomer represented by the formula (12):

$$CX^3_2\!=\!CX^3\!-\!R_f^{121}cHR^{121}X^4 \quad (12)$$

(wherein $X^3$ is a hydrogen atom, a fluorine atom, or $CH_3$; $R_f^{121}$ is a fluoroalkylene group, a perfluoroalkylene group, a fluoro(poly)oxyalkylene group, or a perfluoro(poly)oxyalkylene group; $R^{121}$ is a hydrogen atom or $CH_3$; and $X^4$ is an iodine atom or a bromine atom),
a fluoromonomer represented by the formula (13):

$$CX^3_2\!=\!CX^3\!-\!Rf^{131}X^4 \quad (13)$$

(wherein $X^3$ is a hydrogen atom, a fluorine atom, or $CH_3$; $Rf^{131}$ is a fluoroalkylene group, a perfluoroalkylene group, a fluoro(poly)oxyalkylene group, or a perfluoro(poly)oxyalkylene group; and $X^4$ is an iodine atom or a bromine atom),
a fluoromonomer represented by the formula (14):

$$CF_2\!=\!CFO(CF_2CF(CF_3)O)_m(CF_2)_n\!-\!X^5 \quad (14)$$

(wherein m is an integer of 0 to 5; n is an integer of 1 to 5; and $X^5$ is a cyano group, a carboxyl group, an alkoxycarbonyl group, an iodine atom, a bromine atom, or $-CH_2I$),
a fluoromonomer represented by the formula (15):

$$CH_2\!=\!CFCF_2O(CF(CF_3)CF_2O)_m(CF(CF_3))_n\!-\!X^6 \quad (15)$$

(wherein m is an integer of 0 to 5; n is an integer of 1 to 3; and $X^6$ is a cyano group, a carboxyl group, an alkoxycarbonyl group, an iodine atom, a bromine atom, or $-CH_2OH$), and
a monomer represented by the formula (16):

$$CR^{162}R^{163}\!=\!CR^{164}\!-\!Z\!-\!CR^{165}\!=\!CR^{166}R^{167} \quad (16)$$

(wherein $R^{162}$, $R^{163}$, $R^{164}$, $R^{165}$, $R^{166}$, and $R^{167}$ may be the same as or different from each other, and are each a hydrogen atom or a C1-C5 alkyl group; Z is a C1-C18 linear or branched alkylene group which may optionally have an oxygen atom, a C3-C18 cycloalkylene group, a C1-C10 alkylene or oxyalkylene group that is at least partially fluorinated, or a (per)fluoropolyoxyalkylene group that is represented by the formula: $-(Q)_p\text{-}CF_2O\!-\!(CF_2CF_2O)_m(CF_2O)_n\!-\!CF_2\text{-}(Q)_p\text{-}$ (where Q is an alkylene group or an oxyalkylene group; p is 0 or 1; and m/n is 0.2 to 5) and that has a molecular weight of 500 to 10000).

$X^3$ is preferably a fluorine atom. $R_f^{121}$ and $R_f^{131}$ are each preferably a C1-C5 perfluoroalkylene group. $R^{121}$ is preferably a hydrogen atom.

The monomer that gives a crosslinking site is preferably at least one selected from the group consisting of $CF_2\!=\!CFOCF_2CF(CF_3)OCF_2CF_2CN$, $CF_2\!=\!CFOCF_2CF(CF_3)OCF_2CF_2COOH$, $CF_2\!=\!CFOCF_2CF(CF_3)OCF_2CF_2CH_2I$, $CF_2\!=\!CFOCF_2CF_2CH_2I$, $CH_2\!=\!CFCF_2OCF(CF_3)CF_2OCF(CF_3)CN$, $CH_2\!=\!CFCF_2OCF(CF_3)CF_2OCF(CF_3)COOH$, $CH_2\!=\!CFCF_2OCF(CF_3)CF_2OCF(CF_3)CH_2OH$, $CH_2\!=\!CHCF_2CF_2I$, $CH_2\!=\!CH(CF_2)_2CH\!=\!CH_2$, $CH_2\!=\!CH(CF_2)_4CH\!=\!CH_2$, $CH_2\!-\!CH(CF_2)_6CH\!=\!CH_2$, and $CF_2\!=\!CFO(CF_2)_5CN$, more preferably at least one selected from the group consisting of $CF_2\!=\!CFOCF_2CF(CF_3)OCF_2CF_2CN$ and $CF_2\!=\!CFOCF_2CF_2CH_2I$.

In the production method of the present invention, preferably, only a perfluoromonomer is emulsion-polymerized or only a perfluoromonomer and a monomer that gives a crosslinking site are emulsion-polymerized. Emulsion polymerization of only a perfluoromonomer or of only a perfluoromonomer and a monomer that gives a crosslinking site enables production of an aqueous dispersion containing perfluoroelastomer particles.

The perfluoroelastomer constituting the perfluoroelastomer particles is preferably at least one selected from the group consisting of a copolymer of TFE and a fluoromonomer represented by the formula (3) and a copolymer of TFE, a fluoromonomer represented by the formula (3), and a monomer that gives a crosslinking site.

The perfluoroelastomer constituting the perfluoroelastomer particles is more preferably at least one selected from the group consisting of perfluoroelastomers containing TFE, such as a copolymer of TFE and a fluoromonomer represented by the formula (8), (10), or (11) and a copolymer of TFE, a fluoromonomer represented by the formula (8), (10), or (11), and a monomer that gives a crosslinking site.

In the case of a TFE/PMVE copolymer, the composition thereof is preferably (45 to 90)/(10 to 55) (mol %), more preferably (55 to 80)/(20 to 45), still more preferably (55 to 70)/(30 to 45).

In the case of a copolymer of TFE/PMVE/monomer that gives a crosslinking site, the composition thereof is preferably (45 to 89.9)/(10 to 54.9)/(0.01 to 4) (mol %), more preferably (55 to 79.9)/(20 to 44.9)/(0.1 to 3.5), still more preferably (55 to 69.8)/(30 to 44.8)/(0.2 to 3).

In the case of a copolymer of TFE/C4-C12 fluoromonomer represented by the formula (8), (10), or (11), the composition thereof is preferably (50 to 90)/(10 to 50) (mol %), more preferably (60 to 88)/(12 to 40), still more preferably (65 to 85)/(15 to 35).

In the case of a copolymer of TFE/C4-C12 fluoromonomer represented by the formula (8), (10), or (11)/monomer that gives a crosslinking site, the composition thereof is preferably (50 to 89.9)/(10 to 49.9)/(0.01 to 4) (mol %), more preferably (60 to 87.9)/(12 to 39.9)/(0.1 to 3.5), still more preferably (65 to 84.8)/(15 to 34.8)/(0.2 to 3).

The copolymer having a composition outside the above range tends to lose the properties as a rubbery elastic body and to have resin-like properties.

The perfluoroelastomer is still more preferably at least one selected from the group consisting of a copolymer of TFE and a fluoromonomer represented by the formula (11), a copolymer of TFE, a fluoromonomer represented by the formula (11), and a monomer that gives a crosslinking site, a copolymer of TFE and a fluoromonomer represented by the formula (8), and a copolymer of TFE, a fluoromonomer represented by the formula (8), and a monomer that gives a crosslinking site.

The perfluoroelastomer may also be any of the perfluoroelastomers disclosed in WO 97/24381, JP S61-57324 B, JP H04-81608 B, JP H05-13961 B, and the like.

The composition of the monomer units of the perfluoroelastomer can be determined by any combination of NMR, IR, UV, elemental analysis, and X-ray fluorescence analysis in accordance with the types of the monomers.

The aqueous medium used in the emulsion polymerization is a reaction medium where polymerization is performed and means a liquid containing water. The aqueous medium may be any medium containing water, and may be a medium containing water and a fluorine-free organic solvent, such as an alcohol, ether, or ketone, and/or a fluorine-containing organic solvent having a boiling point of 200° C. or lower.

The emulsion polymerization is usually performed in the presence of a polymerization initiator. The polymerization initiator to be used may be an oil-soluble radical polymerization initiator or a water-soluble radical initiator.

The oil-soluble radical polymerization initiator may be a known oil-soluble peroxide, and typical examples thereof include dialkyl peroxycarbonates such as diisopropyl peroxydicarbonate and di-sec-butyl peroxydicarbonate; peroxy esters such as t-butyl peroxyisobutyrate and t-butyl peroxypivalate; dialkyl peroxides such as di-t-butyl peroxide; and di(perfluoro (or fluorochloro)acyl)peroxides such as di(ω-hydro-dodecafluoroheptanoyl)peroxide, di(ω-hydro-tetradecafluoroheptanoyl)peroxide, di(ω-hydro-hexadecafluorononanoyl)peroxide, di(perfluorobutyryl)peroxide, di(perfluorovaleryl)peroxide, di(perfluorohexanoyl)peroxide, di(perfluoroheptanoyl)peroxide, di(perfluorooctanoyl)peroxide, di(perfluorononanoyl)peroxide, di(ω-chlorohexafluorobutyryl)peroxide, di(ω-chloro-decafluorohexanoyl)peroxide, di(ω-chloro-tetradecafluorooctanoyl)peroxide, ω-hydro-dodecafluoroheptanoyl-ω-hydrohexadecafluorononanoyl-peroxide, ω-chloro-hexafluorobutyryl-ω-chloro-decafluorohexanoyl-peroxide, ω-hydrododecafluoroheptanoyl-perfluorobutyryl-peroxide, di(dichloropentafluorobutanoyl)peroxide, di(trichlorooctafluorohexanoyl)peroxide, di(tetrachloroundecafluorooctanoyl)peroxide, di(pentachlorotetradecafluorodecanoyl)peroxide, and di(undecachlorodotriacontafluorodocosanoyl)peroxide.

The water-soluble radical polymerization initiator may be a known water-soluble peroxide, and examples thereof include ammonium salts, potassium salts, sodium salts, t-butyl permaleates, and t-butyl hydroperoxides of persulfuric acid, perboric acid, perchloric acid, perphosphoric acid, or percarbonic acid. Any reducing agent such as a sulfite or a sulfurous acid salt may be used in combination, and the amount thereof may be 0.1 to 20 times of the amount of the peroxide.

In the case of emulsion polymerization at a low temperature of 45° C. or lower, a redox initiator that is a combination of an oxidizing agent and a reducing agent is preferably used as a polymerization initiator. The oxidizing agent is preferably a persulfate and the reducing agent is preferably a sulfite. Examples of the persulfate include ammonium persulfate and potassium persulfate. Examples of the sulfite include sodium sulfite and ammonium sulfite. In order to increase the decomposing rate of the initiator, the combination of the redox initiator may also preferably include a copper salt and/or an iron salt. Examples of the copper salt include copper(II) sulfate and examples of the iron salt include iron(II) sulfate.

The polymerization initiator may be added in any amount. The initiator in an amount that does not significantly decrease the polymerization rate (e.g., several parts per million in water) or more may be added at once in the early stage of polymerization, or may be added successively or continually. The upper limit of the amount thereof is within a range where the polymerization reaction heat can be removed from the surface of a production device.

The emulsion polymerization may be performed in the presence of a chain-transfer agent. Examples of the chain-transfer agent include esters such as dimethyl malonate, diethyl malonate, methyl acetate, ethyl acetate, butyl acetate, and dimethyl succinate, as well as isopentane, methane, ethane, propane, isopropanol, acetone, mercaptans, carbon tetrachloride, and cyclohexane.

The chain-transfer agent may be a bromine compound or an iodine compound. One example of a polymerization method using a bromine compound or an iodine compound is a method in which a fluoromonomer is polymerized in an aqueous medium substantially in the absence of oxygen and in the presence of a bromine compound or an iodine compound (iodine transfer polymerization). Representative examples of the bromine compound or the iodine compound to be used include compounds represented by the following formula:

$$R^2I_xBr_y$$

(wherein x and y are each an integer of 0 to 2 and satisfy $1 \le x+y \le 2$; and $R^2$ is a C1-C16 saturated or unsaturated fluorohydrocarbon or chlorofluorohydrocarbon group, or a C1-C3 hydrocarbon group, each of which may optionally have an oxygen atom). Use of a bromine compound or an iodine compound enables introduction of iodine or bromine into the polymer, and the introduced atom serves as a crosslinking point.

Examples of the iodine compound include 1,3-diiodoperfluoropropane, 2-iodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1,2-bromo-4-iodoperfluorobutene-1, and a monoiodo- and monobromo-substitution product, a diiodo- and monobromo-substitution product, and (2-iodoethyl)- and (2-bromoethyl)-substitution product of benzene. These compounds may be used alone or in any combination.

For good polymerization reactivity, crosslinkability, easy availability, and other properties, 1,4-diiodoperfluorobutane, 1,6-diiodoperfluorohexane, or 2-iodoperfluoropropane is preferably used.

The amount of the chain-transfer agent is usually 1 to 100000 ppm relative to all the monomers supplied. The lower limit thereof is preferably 10 ppm, and the upper limit thereof is preferably 50000 ppm.

The polymerization temperature, the polymerization pressure, and the polymerization time may vary in accordance with the types of the solvent and the polymerization initiator, and may be respectively −15° C. to 150° C., atmospheric pressure to 6.5 MPa, and 1 to 96 hours. In the case of using an oil-soluble radical polymerization initiator containing a fluorine atom, the polymerization temperature is preferably 15° C. to 95° C. In the case of using a water-soluble radical polymerization initiator as a polymerization initiator, the polymerization temperature is preferably 0° C. to 100° C., more preferably 10° C. to 95° C.

The emulsion polymerization is preferably performed at 0.1 to 3.9 MPaG, more preferably 0.6 MPaG or higher and 3.0 MPaG or lower.

The emulsion polymerization in the production method of the present invention may be performed as follows. A polymerization reactor is charged with an aqueous medium, a fluorosurfactant (1), and a monomer. The contents of the reactor are stirred and the reactor is maintained at a predetermined polymerization temperature. Then, a polymerization initiator is added so that the polymerization reaction is started. Alternatively, the emulsion polymerization may be performed as follows. A polymerization reactor is charged with an aqueous medium and a fluorosurfactant (1). The contents are stirred and the reactor is maintained at a predetermined polymerization temperature. A monomer is then added, and a polymerization initiator is next added so that the polymerization reaction is started. If necessary, any additives, for example, may be put into the reactor before the start of the polymerization reaction. In accordance with the purposes, the monomer, the polymerization initiator, the chain-transfer agent, and other components may be further added after the start of the polymerization reaction.

The emulsion polymerization in the production method of the present invention is preferably performed in the absence of a fluorine-containing compound represented by the following formula (2):

$$X\text{---}(CF_2)_{n2}\text{---}Y \qquad (2)$$

(wherein X is H or F; m2 is an integer of 7 or greater; Y is $-SO_3M$, $-SO_4M$, $-SO_3R$, $-SO_4R$, $-COOM$, $-PO_3M_2$, or $-PO_4M_2$ (where M is H, $NH_4$, or an alkali metal; and R is a C1-C12 alkyl group)). The production method of the present invention enables a sufficient number of particles and a sufficient polymerization rate even without such a conventional fluorosurfactant. Further, the emulsion polymerization is preferably performed in the absence of any fluorosurfactant other than the fluorosurfactant (1).

The emulsion polymerization is preferably radical polymerization.

The emulsion polymerization enables production of an aqueous dispersion containing perfluoroelastomer particles.

The aqueous dispersion containing perfluoroelastomer particles preferably contains $5 \times 10^{14}$ or more perfluoroelastomer particles per cc. Such a large number of particles advantageously lead to a high polymerization rate and improved productivity of a perfluoroelastomer. The number of particles can be controlled by adjusting properties such as the amount of the fluorosurfactant (1), the stirring rate, and the amount of the monomer added. The lower limit of the number of particles is more preferably $1 \times 10^{15}$ per cc, still more preferably $7 \times 10^{15}$ per cc. The upper limit may be any value, and is preferably $5 \times 10^{17}$ per cc. The number of particles is determined by the method to be mentioned in the Examples.

The perfluoroelastomer particles preferably have a volume average particle size of 0.1 to 100 nm. The volume average particle size within the above range leads to a large number of particles per unit amount of the aqueous medium and a high polymerization rate. This results in improved productivity in synthesis of perfluoroelastomer particles. The volume average particle size of the perfluoroelastomer particles is more preferably 0.5 nm or greater, still more preferably 1.0 nm or greater, while more preferably 70 nm or smaller, still more preferably 50 nm or smaller, particularly preferably 30 nm or smaller. The volume average particle size is determined by the method to be mentioned in the Examples.

The aqueous dispersion containing perfluoroelastomer particles preferably has a solid content of 1 mass % or more, more preferably 10 mass % or more, still more preferably 18 mass % or more. In comparison between groups of the perfluoroelastomer particles having the same particle size, such a high solid content leads to a larger number of particles based on the unit amount of the aqueous medium and a higher polymerization rate. This leads to improved productivity in synthesis of perfluoroelastomer particles. The upper limit thereof may be any value, and is preferably 30 mass %. The solid content is determined by the method to be mentioned in the Examples.

The aqueous dispersion containing perfluoroelastomer particles may be subjected to multi-stage polymerization. In other words, the fluoromonomer may be further polymerized in an aqueous medium in the presence of perfluoroelastomer particles and a polymerization initiator.

For excellent compression set at high temperature, the perfluoroelastomer preferably has a glass transition temperature of −70° C. or higher, more preferably −50° C. or higher, still more preferably −30° C. or higher. For good cold resistance, the glass transition temperature is preferably 5° C. or lower, more preferably 0° C. or lower, still more preferably −3° C. or lower.

The glass transition temperature can be determined as follows. First, 10 mg of a sample is heated at a rate of 10° C./min using a differential scanning calorimeter (DSC822e, Mettler-Toledo International Inc.) so that a DSC curve is obtained. Then, the peak-top temperature on the differential curve regulated in JIS K6240 is defined as the glass transition temperature.

For good heat resistance, the perfluoroelastomer preferably has a Mooney viscosity ML(1+10) at 100° C. of 10 or higher, more preferably 20 or higher, still more preferably 30 or higher. For good processability, the Mooney viscosity ML(1+10) at 100° C. is preferably 120 or lower, more preferably 100 or lower, still more preferably 80 or lower.

For good heat resistance, the perfluoroelastomer preferably has a Mooney viscosity ML(1+20) at 170° C. of 30 or higher, more preferably 40 or higher, still more preferably 50 or higher. For good processability, the Mooney viscosity ML(1+20) at 170° C. is preferably 150 or lower, more preferably 120 or lower, still more preferably 110 or lower.

The Mooney viscosity can be determined at 100° C. or 170° C. using a Mooney viscometer MV2000E (Alpha Technologies Inc.) in conformity with JIS K6300.

In the case of using a fluoromonomer having an iodine atom as the fluoromonomer and/or in the case of using an iodine compound as a chain-transfer agent, the iodine content in the resulting perfluoroelastomer is preferably 0.02 to 5.0 mass % so as to peroxide-crosslink the perfluoroelastomer and to provide a crosslinked elastic body of the perfluoroelastomer excellent in mechanical properties. The iodine content is more preferably 0.05 to 3.0 mass %, still more preferably 0.1 to 2.0 mass %.

The present invention also relates to a method for producing a perfluoroelastomer including providing a perfluoroelastomer by removing the aqueous medium from the aqueous dispersion containing perfluoroelastomer particles obtained by the above method for producing an aqueous perfluoroelastomer dispersion.

Examples of the method of removing the aqueous medium from the aqueous dispersion containing perfluoroelastomer particles include (i) a method of heating and/or evacuating the aqueous dispersion and (ii) a method of coagulating the aqueous dispersion to provide a coagulated product, and then heating and/or evacuating the coagulated product. The aqueous dispersion obtained by the method for producing an aqueous perfluoroelastomer dispersion contains the fluorosurfactant (1). The fluorosurfactant (1) is more easily removed by heating and/or evacuation than conventional fluorosurfactants such as perfluorooctanoic acid or a salt thereof. Thus, in the method for producing a perfluoroelastomer of the present invention, the fluorosurfactant (1) is also sufficiently removed simultaneously with the aqueous medium.

In order to remove the aqueous medium and the fluorosurfactant (1) without deteriorating the perfluoroelastomer itself, the heating in the method (i) is preferably performed at 50° C. to 200° C. for 2 to 100 hours. The evacuation in the method (i) is preferably performed by leaving the aqueous dispersion under vacuum for 2 to 100 hours. The method (i) preferably includes the heating. In order to more securely remove the aqueous medium and the fluorosurfactant (1), the method (i) more preferably includes both the heating and the evacuation (for example, the heating under vacuum).

The coagulation in the method (ii) can be performed by adding an inorganic salt or an inorganic acid such as aluminum sulfate to the aqueous dispersion, by applying a mechanical shearing force to the aqueous dispersion, or by freezing the aqueous dispersion. In order to remove the aqueous medium and the fluorosurfactant (1) without deteriorating the perfluoroelastomer itself, the heating in the method (ii) is preferably performed at 50° C. to 200° C. for 2 to 100 hours. The evacuation in the method (ii) is preferably performed by leaving the coagulated product under vacuum for 2 to 100 hours. The method (ii) preferably includes the heating. In order to more securely remove the aqueous medium and the fluorosurfactant (1), the method (ii) more preferably includes both the heating and the evacuation (for example, the heating under vacuum).

If necessary, the method (ii) may include washing of the coagulated product obtained by coagulating the aqueous dispersion. The washing may be performed by a usual method.

The method of removing the aqueous medium from the aqueous dispersion containing perfluoroelastomer particles is preferably the method (ii) so as to achieve the following effects. Coagulation of the aqueous dispersion containing perfluoroelastomer particles provides a massive coagulated product. Since the fluorosurfactant used in the emulsion polymerization is contained in the coagulated product, the fluorosurfactant cannot be sufficiently removed only by washing. Thus, the heating and/or the evacuation need(s) to be performed to remove the fluorosurfactant. Since the fluorosurfactant contained in the aqueous dispersion obtained by the method for producing an aqueous perfluoroelastomer dispersion is the fluorosurfactant (1), it is more easily removed by heating and/or evacuation than conventional fluorosurfactants such as perfluorooctanoic acid or a salt thereof. The fluorosurfactant (1) can be much more easily removed by heat-drying under vacuum.

The above method provides a perfluoroelastomer. The perfluoroelastomer may be in the form of a crumb or a sheet.

The aqueous perfluoroelastomer dispersion and the perfluoroelastomer obtained by the production methods of the present invention have excellent physical properties that are never inferior to those of conventionally known aqueous perfluoroelastomer dispersions and perfluoroelastomers, can be used in the same methods and can be used for the same applications as for conventionally known aqueous perfluoroelastomer dispersion and perfluoroelastomers.

Also useful one is a perfluoroelastomer including 42.0 to 55.0 mol % of a polymerized unit based on perfluoro(alkyl vinyl ether) (PAVE) in all the polymerized units and having a Mooney viscosity ML(1+20) at 170° C. of 30 to 120. This perfluoroelastomer is a novel perfluoroelastomer. The above production method can easily provide such a perfluoroelastomer.

Since including 42.0 to 55.0 mol % of the polymerized unit based on PAVE in all the polymerized units, the perfluoroelastomer is excellent in low-temperature resistance. The lower limit of the amount of the polymerized unit based on PAVE is preferably 42.5 mol %, more preferably 43.0 mol %, still more preferably 43.5 mol %, in all the polymerized units. The upper limit thereof is preferably 54.0 mol %, more preferably 53.0 mol %, still more preferably 52.0 mol %, in all the polymerized units.

The PAVE is preferably those represented by the following formula (8):

$$CF_2=CF-ORf^{81}$$

(wherein $Rf^{81}$ is a C1-C8 perfluoroalkyl group), more preferably at least one selected from the group consisting of perfluoro(methyl vinyl ether) (PMVE), perfluoro(ethyl vinyl ether), and perfluoro(propyl vinyl ether), still more preferably perfluoro(methyl vinyl ether).

The perfluoroelastomer preferably includes a polymerized unit based on tetrafluoroethylene (TFE). The amount of the polymerized unit based on TFE is preferably 45.0 to 58.0 mol % in all the polymerized units. The lower limit of the amount of the polymerized unit based on TFE is more preferably 46.0 mol %, still more preferably 47.0 mol %, particularly preferably 48.0 mol %, in all the polymerized units. The upper limit thereof is more preferably 57.5 mol %, still more preferably 57.0 mol %, particularly preferably 56.5 mol %, in all the polymerized units.

The lower limit of the amount of the polymerized unit based on TFE may be 44.99 mol %, may be 44.9 mol %, or may be 44.8 mol %, in all the polymerized units. The upper limit of the amount of the polymerized unit based on TFE may be 57.99 mol %, may be 57.9 mol %, or may be 57.8 mol %, in all the polymerized units.

The perfluoroelastomer may further include a polymerized unit based on a perfluoromonomer other than TFE and PAVE and a polymerized unit based on a monomer that gives a crosslinking site.

Examples of the perfluoromonomer other than TFE and PAVE include the aforementioned perfluoromonomers other than TFE and PAVE.

Examples of the monomer that gives a crosslinking site include those mentioned above. Preferred among these is a monomer having a cyano group. Preferred is at least one selected from the group consisting of $CF_2=CFOCF_2CF(CF_3)OCF_2CF_2CN$, $CH_2=CFCF_2OCF(CF_3)CF_2OCF(CF_3)CN$, and $CF_2=CFO(CF_2)_5CN$, more preferred is at least one selected from the group consisting of $CF_2=CFOCF_2CF(CF_3)OCF_2CF_2CN$ and $CF_2=CFO(CF_2)_5CN$, still more preferred is $CF_2=CFOCF_2CF(CF_3)OCF_2CF_2CN$.

The amount of the polymerized unit based on the monomer that gives a crosslinking site has only to be 10 mol % or less in all the polymerized units, and is preferably 0.01 to 4.00 mol %. The lower limit thereof is more preferably 0.1 mol %, still more preferably 0.2 mol %. The upper limit thereof is more preferably 3.5 mol %, still more preferably 3 mol %.

The perfluoroelastomer preferably has a cyano group. This can provide a cured product excellent in heat resistance. The cyano group can be introduced by copolymerization of the monomer having a cyano group, for example.

Since having a Mooney viscosity ML(1+20) at 170° C. of 30 to 120, the perfluoroelastomer is excellent in vulcanizability and can provide a vulcanized product excellent in tensile strength and compression set resistance. The lower limit of the Mooney viscosity ML(1+20) at 170° C. is preferably 35, more preferably 40, still more preferably 45. The upper limit thereof is preferably 115, more preferably 110, still more preferably 105.

The aqueous perfluoroelastomer dispersion obtained by the method for producing an aqueous perfluoroelastomer dispersion of the present invention, the perfluoroelastomer obtained by the method for producing a perfluoroelastomer of the present invention, and the aforementioned novel perfluoroelastomer can constitute a perfluoroelastomer composition together with required components. Such a perfluoroelastomer composition is also useful. The perfluoroelastomer composition preferably contains a perfluoroelastomer and a crosslinker, and may further contain water and/or an organic solvent in accordance with the use thereof. The perfluoroelastomer composition may be prepared by adding required components to the aqueous perfluoroelastomer dispersion, or may be prepared by adding required components to the perfluoroelastomer.

The perfluoroelastomer composition may be crosslinked and molded into a molded article, and this molded article can be applied to various uses. Such a molded article is also useful.

The molded article may be produced by molding the perfluoroelastomer composition and crosslinking the resulting molded article, or may be produced by simultaneously molding and crosslinking the perfluoroelastomer composition. The molding may be achieved by any method, and examples thereof include compression molding, extrusion molding, transfer molding, and injection molding. The molded article may be prepared as a coat by applying and crosslinking the perfluoroelastomer composition.

Examples of the fields where the molded article is used include the field relating to semiconductors, the field of automobiles, the field of aircraft, the field of space and rockets, the field of shipping, the field of chemistry (e.g., chemical plants), the field of chemicals (e.g., pharmaceuticals), the field of photography (e.g., film processors), the field of printing (e.g., printers), the field of coating (e.g., coating equipment), the field of analysis and physical and chemical instruments (e.g., analyzers and measuring devices), the field of food machinery (e.g., food plant equipment and household items), the field of beverage and food production equipment, the field of drug production equipment, the field of medical parts, the field of equipment for transporting chemicals, the field of equipment for nuclear power plants, the field of steel (e.g., sheet steel processing equipment), the field of general industry, the field of electrics, the field of fuel cells, the field of electronic parts, the field of parts of optical devices, the field of parts of space devices, the field of equipment for petrochemical plants, the field of parts of equipment for prospecting and mining energy sources such as petroleum and gas, the field of oil refining, and the field of parts of equipment for transporting petroleum.

The molded article may be used in any of various forms such as seal materials and packings, including rings, packings, gaskets, diaphragms, oil seals, bearing seals, lip seals, plunger seals, door seals, lip and face seals, gas delivery plate seals, wafer support seals, and barrel seals. The seal materials may be used in applications requiring heat resistance, solvent resistance, chemical resistance, and non-stickiness.

The molded article may also be used as any of tubes, hoses, rolls, rubber rolls, flexible joints, rubber plates, coatings, belts, dampers, valves, valve sheets, valve bodies, chemical-resistant coating materials, laminating materials, and lining materials.

The cross-sectional shapes of the above rings, packings, and seals may be any various shapes, such as a rectangular shape, an O-like shape, and a ferrule shape, and any deformed shapes such as D-like, L-like, T-like, V-like, X-like, and Y-like shapes.

In the field relating to semiconductors, the molded article may be used for semiconductor manufacturing devices, liquid crystal panel manufacturing devices, plasma panel manufacturing devices, plasma display panel manufacturing devices, plasma addressed liquid crystal panel manufacturing devices, organic EL panel manufacturing devices, field emission display panel manufacturing devices, solar cell substrate manufacturing devices, and semiconductor transporting devices. Examples of such devices include CVD devices, gas control devices (e.g., gas control devices for semiconductors), dry etching devices, wet etching devices, plasma etching devices, reactive ion etching devices, reactive ion beam etching devices, sputter etching devices, ion beam etching devices, diffusion and oxidation devices, spattering devices, ashing devices, plasma ashing devices, washing devices, ion implantation devices, plasma CVD devices, exhaust devices, exposure devices, grinding devices, film-forming devices, dry-etching washing devices, UV/$O_3$ washing devices, ion beam washing devices, laser beam washing devices, plasma washing devices, gas etching washing devices, extraction washing devices, Soxhlet extraction washing devices, high-temperature high-pressure extraction washing devices, microwave extraction washing devices, supercritical extraction washing devices, washing devices using hydrofluoric acid, hydrochloric acid, sulfuric acid, or ozonated water, steppers, coaters and developers, CMP devices, excimer laser exposure devices, chemical liquid pipes, gas pipes, devices involving plasma treatment (e.g., $NF_3$ plasma treatment, $O_2$ plasma treatment, fluorine plasma treatment), heating film-forming devices, wafer transporting devices, wafer washing devices, silicon wafer washing devices, silicon wafer processing devices, devices used in LP-CVD, devices used in lamp annealing, and devices used in reflow.

Specific examples of applications in the field relating to semiconductors include seal materials such as O-rings and gaskets for gate valves, quartz windows, chambers, chamber lids, gates, bell jars, couplings, and pumps; seal materials (e.g., O-rings), hoses, and tubes for resist developers and strippers; lining and coating of resist developer tanks, stripper tanks, wafer cleaning liquid tanks, and wet etching tanks; diaphragms of pumps; rolls for transporting wafers; hoses and tubes for wafer cleaning liquids; seal materials for clean equipment, such as sealants for clean equipment (e.g., cleanrooms); sealing materials for storage cabinets for devices such as semiconductor manufacturing devices and wafers; and diaphragms for transporting chemical liquids used in production of semiconductors.

In the field of automobiles, the molded article may be used for engine bodies, main drive systems, valve train systems, lubrication and cooling systems, fuel systems, intake and exhaust systems, transmission systems of driveline systems, steering systems and braking systems of chassis, and electrical parts (e.g., basic electrical parts, electrical parts of control systems, electrical accessories). The field of automobiles also relates to motorcycles.

In relation to the aforementioned engine bodies and peripherals thereof, the molded article may be used for seal materials requiring heat resistance, oil resistance, fuel oil resistance, resistance to antifreeze for engine cooling, and steam resistance. Examples of such seal materials include seals (e.g., gaskets, shaft seals, valve stem seals), non-contact or contact packings (e.g., self-seal packings, piston rings, split ring packings, mechanical seals, oil seals), bellows, diaphragms, hoses, tubes, and seal materials used for electric wires, cushioning materials, damping materials, and belt AT devices.

Specific examples of applications in the fuel systems include O-rings used for fuel injectors, cold start injectors, quick connectors of fuel lines, sender flange quick connectors, fuel pumps, fuel tank quick connectors, gasoline mixing pumps, gasoline pumps, tube bodies of fuel tubes, connectors of fuel tubes, and injectors; seals used for exhaust manifolds, fuel filters, pressure control valves, canisters, caps of fuel tanks, fuel pumps, fuel tanks, sender units of fuel tanks, fuel injection systems, high pressure fuel pumps, fuel line connector systems, pump timing control valves, suction control valves, solenoid sub-assemblies, and fuel cut valves; canister purge solenoid valve seals, onboard refueling vapor recovery (ORVR) valve seals, oil seals for fuel pumps, fuel sender seals, fuel tank roll over valve seals, filler seals, injector seals, filler cap seals, and seals of filler cap valves; hoses such as fuel hoses, fuel supply hoses, fuel return hoses, vapor (evaporator) hoses, vent (breather) hoses, filler hoses, filler neck hoses, hoses inside fuel tanks (in-tank hoses), control hoses of carburetors, fuel inlet hoses, and fuel breather hoses; gaskets used for fuel filters and fuel line connector systems, and flange gaskets used for carburetors; lining materials for vapor recovering lines, fuel feed lines, and vapor ORVR lines; diaphragms used for canisters, ORVR, fuel pumps, fuel tank pressure sensors, gasoline pumps, sensors of carburetors, combined air controlling (CAC) systems, pulsation dampers, canisters, and auto-valves, and pressure regulator diaphragms of fuel injection systems; valves for fuel pumps, carburetor needle valves, roll over check valves, and check valves; tubes used in vents (breathers) and fuel tanks; tank packings of, for example, fuel tanks, and packings of acceleration pump pistons of carburetors; fuel sender damping parts for fuel tanks; O-rings and diaphragms for regulating fuel pressure; accelerator pump cups; in-tank fuel pump mounts; injector cushion rings of fuel injection systems; injector seal rings; needle valve cores of carburetors; acceleration pump pistons of carburetors; valve sheets of combined air controlling (CAC) systems; fuel tank bodies; and sealing parts for solenoid valves.

Specific examples of applications in the brake systems include diaphragms used for mastervacs, hydraulic brake hose, air brakes, and brake chambers of air brakes; hoses used as brake hoses, brake oil hoses, and vacuum brake hoses; seal materials such as oil seals, O-rings, packings, and brake piston seals; air valves and vacuum valves for mastervacs, and check valves for brake valves; piston cups (rubber cups) for master cylinders and brake cups; and O-rings and grommets for master cylinders and vacuum boosters of hydraulic brakes, boots for wheel cylinders of hydraulic brakes, and anti-lock brake systems (ABS).

Specific examples of applications in the basic electrical parts include insulators and sheaths of electric wires (harnesses), tubes of harness exterior parts, and grommets for connectors.

Specific examples of applications in the electrical parts of control systems include coating materials of various sensor lines.

Specific examples of applications in the electrical accessories include O-rings and packings of automobile air conditioners, cooler hoses, high-pressure air conditioner hoses, air conditioner hoses, gaskets for electronic throttle units, plug boots for direct ignition, and diaphragms for distributors. Further, the molded article may be used for bonding of electric parts.

Specific examples of applications in the intake and exhaust systems include packings used for intake manifolds and exhaust manifolds and throttle body packings of throttles; diaphragms used for exhaust gas recirculation (EGR) systems, pressure control (BPT) systems, wastegates, turbocharger wastegates, actuators, actuators of variable turbine geometry (VTG) turbochargers, and exhaust purifying valves; hoses such as control hoses of exhaust gas recirculation (EGR) systems, emission control hoses, turbo oil hoses (feed side), turbo oil hoses (return side), turbo air hoses, and intercooler hoses of turbochargers, turbocharger hoses, hoses connected with compressors of turbo engines equipped with intercoolers, exhaust gas hoses, air intake hoses, turbo hoses, and diesel particulate filter (DPF) sensor hoses; air ducts and turbo air ducts; intake manifold gaskets; and seal materials of EGR systems, valve sheets for preventing after burn of AB valves, turbine shaft seals (of turbochargers, for example), and seal parts used for groove parts of rocker covers and air intake manifolds used in engines of automobiles.

In addition, with respect to the exhaust gas control parts, the molded article may be used as any of seals used for vapor recovery canisters, catalytic converters, exhaust gas sensors, and oxygen sensors and seals for solenoid armatures of vapor recovery and vapor canisters; and intake manifold gaskets.

With respect to the diesel engine-related parts, the molded article may be used as any of O-ring seals for direct injectors, rotary pump seals, control diaphragms, fuel hoses, EGR systems, priming pumps, and diaphragms of boost compensators. The molded article may also be used for O-rings, seal materials, hoses, tubes, and diaphragms used in urea SCR systems, urea solution tank bodies of urea SCR systems, and seal materials of urea solution tanks.

Specific examples of applications in the transmission systems include transmission-related bearing seals, oil seals, O-rings, packings, and torque converter hoses.

Examples of applications also include mission oil seals, and mission oil hoses, ATF hoses, O-rings, and packings of AT.

Examples of the transmission include automatic transmission (AT), manual transmission (MT), continuously variable transmission (CVT), and dual clutch transmission (DCT).

Examples of applications also include oil seals, gaskets, O-rings, and packings for manual or automatic transmissions, oil seals, gaskets, O-rings, and packings for (belt-type or toroidal-type) continuously variable transmissions, packings for ATF linear solenoids, oil hoses for manual transmissions, ATF hoses for automatic transmissions, and CVTF hoses for (belt-type or toroidal-type) continuously variable transmissions.

Specific examples of applications in the steering systems include power steering oil hoses and high-pressure power steering hoses.

Examples of applications used in engine bodies of automobile engines include gaskets such as cylinder head gaskets, cylinder head cover gaskets, oil pan packings, and general gaskets, seals such as O-rings, packings, and timing belt cover gaskets, hoses such as control hoses, damper rubbers of engine mounts, control valve diaphragms, and camshaft oil seals.

Examples of applications in the main drive systems of automobile engines include shaft seals such as crankshaft seals and camshaft seals.

Examples of applications in the valve train systems of automobile engines include valve stem oil seals of engine valves and valve sheets of butterfly valves.

Examples of applications in the lubrication and cooling systems of automobile engines include engine oil cooler hoses of engine oil coolers, oil return hoses, seal gaskets, water hoses used around radiators, seals of radiators, gaskets of radiators, O-rings of radiators, vacuum pump oil hoses of vacuum pumps, radiator hoses, radiator tanks, diaphragms for oil pressure, and fan coupling seals.

As mentioned above, specific examples of applications in the field of automobiles include engine head gaskets, oil pan gaskets, manifold packings, seals for oxygen sensors, oxygen sensor bushes, seals for nitrogen oxide (NOx) sensors, nitrogen oxide (NOx) sensor bushes, seals for sulfur oxide sensors, seals for temperature sensors, temperature sensor bushes, seals for diesel particulate filter sensors, diesel particulate filter sensor bushes, injector O-rings, injector packings, O-rings and diaphragms of fuel pumps, gearbox seals, power piston packings, seals of cylinder liners, seals of valve stems, static valve stem seals, dynamic valve stem seals, front pump seals of automatic transmissions, rear axle pinion seals, gaskets of universal joints, pinion seals of speedometers, piston cups of foot brakes, O-rings and oil seals of torque transmission systems, seals and bearing seals of exhaust gas re-combustion systems, hoses for re-combustion systems, diaphragms for sensors of carburetors, damper rubbers (e.g., engine mounts, exhaust parts, muffler hangers, suspension bushes, center bearings, strut bumper rubbers), damper rubbers (e.g., strut mounts, bushes) for suspensions, drive system damper rubbers (e.g., dampers), fuel hoses, tubes and hoses of EGR systems, twin carburetor tubes, cores of needle valves of carburetors, flange gaskets of carburetors, oil hoses, oil cooler hoses, ATF hoses, cylinder head gaskets, water pump seals, gearbox seals, needle valve tips, reeds of reed valves for motorcycles, oil seals of automobile engines, seals of gasoline hose guns, seals for automobile air conditioners, rubber hoses for intercoolers of engines, seals of fuel line connector systems, CAC valves, needle tips, electric wires around engines, filler hoses, automobile air conditioner O-rings, intake gaskets, fuel tank materials, diaphragms for distributors, water hoses, clutch hoses, PS hoses, AT hoses, mastervac hoses, heater hoses, air conditioner hoses, ventilation hoses, oil filler caps, PS rack seals, rack and pinion boots, CVJ boots, ball joint dust covers, strut dust covers, weather strips, glass run channels, center unit packings, body side welts, bumper rubbers, door latches, dash insulators, high tension cords, flat belts, poly V-belts, timing belts, toothed belts, V-ribbed belts, tires, wiper blades, diaphragms and plungers for regulators of LPG vehicles, diaphragms and valves for regulators of CNG vehicles, DME-resistant rubber parts, diaphragms and boots of automatic belt tensioners, diaphragms and valves for idle speed control, actuators for cruise control, diaphragms, check valves, and plungers of negative-pressure pumps, diaphragms and O-rings of O.P.S., gasoline pressure relief valves, O-rings and gaskets of engine cylinder sleeves, O-rings and gaskets of wet cylinder sleeves, seals and gaskets of differential gears (seals and gaskets for gear oils), seals and gaskets of power steering systems (seals and gaskets of PSF), seals and gaskets of shock absorbers (seals and gaskets of SAF), seals and gaskets of constant-velocity joints, seals and gaskets of wheel bearings, coatings for metal gaskets, caliper seals, boots, wheel bearing seals, and bladders used in vulcanization molding of tires.

In the fields of aircraft, space and rockets, and shipping, the molded article may especially be used in the fuel systems and the lubrication systems.

In the field of aircraft, the molded article may be used as, for example, any of seal parts for aircraft, parts for aircraft used in relation to engine oils for aircraft, jet engine valve stem seals, gaskets, O-rings, rotary shaft seals, gaskets of hydraulic equipment, fire wall seals, hoses, gaskets, and O-rings for fuel feed, and cables, oil seals, and shaft seals for aircraft.

In the field of space and rockets, the molded article may be used as, for example, any of lip seals, diaphragms, and O-rings of spacecraft, jet engines, and missiles, O-rings resistant to oils for gas turbine engines, and damper stage pads for ground level control of missiles.

In the field of shipping, the molded article may be used as, for example, any of propeller shaft stern seals of screws, valve stem seals for intake and exhaustion of diesel engines, valve seals of butterfly valves, valve sheets and shaft seals of butterfly valves, shaft seals of butterfly valves, stern tube seals, fuel hoses and gaskets, O-rings for engines, cables for shipping, oil seals for shipping, and shaft seals for shipping.

In the field of chemistry (e.g., chemical plants) and the field of chemicals (e.g., pharmaceuticals), the molded article may be used in steps requiring high-level chemical resistance, such as steps of manufacturing chemicals, including pharmaceuticals, agrochemicals, coatings, and resins.

Specific examples of applications in the fields of chemistry and chemicals include: seals used for chemical devices, pumps for chemicals, flow meters, pipes for chemicals, heat exchangers, agrochemical sprayers, agrochemical transporting pumps, gas pipes, fuel cells, analyzers and physical and chemical instruments (e.g., column fittings of analyzers and measuring instruments), expansion joints of flue-gas desulfurization devices, nitric acid plants, and turbines of power plants, seals used in medical sterilization processes, seals for plating solutions, runner seals of belts for papermaking, and joint seals of wind tunnels; O-rings used in chemical devices (e.g., rectors, stirrers), analyzers and measuring instruments, chemical pumps, pump housings, valves, and tachometers, O-rings for mechanical seals, and O-rings for compressor sealing; packings used in high-temperature vacuum dryers and tube joints of gas chromatographs and pH meters, and glass cooler packings of sulfuric acid manufacturing devices; diaphragms used in diaphragm pumps, analyzers, and physical and chemical instruments; gaskets used in analyzers and measuring instruments; ferrules used in analyzers and measuring instruments; valve sheets; U-cups; linings used in chemical devices, gasoline tanks, and wind tunnels, and corrosion-resistant linings of tanks for anodizing on aluminum; coatings of masking jigs for plating; valve parts of analyzers and physical and chemical instruments; expansion joints of flue-gas desulfurization plants; hoses resistant to acids such as concentrated sulfuric acid, chlorine gas transporting hoses, oil-resistant hoses, and rainwater drainage hoses of benzene or toluene storage tanks; chemical-resistant tubes used in analyzers and physical and chemical instruments and medical tubes; trichloroethylene-resistant rolls for fiber dyeing and rolls for dyeing; stoppers for pharmaceuticals; medical rubber stoppers; chemical bottles, chemical tanks, bags, and chemical containers; strong acid-resistant and solvent-resistant protective items such as gloves and boots.

In the field of photography (e.g., film processors), the field of printing (e.g., printers), and the field of coatings (e.g., coating equipment), the molded article may be used as any of rolls, belts, seals, and valve parts of dry copiers.

Specific examples of applications in the field of photography, the field of printing, and the field of coatings include surface layers of transfer rollers of copiers, cleaning blades of copiers, and belts of copiers; rolls (e.g., fixing rolls, adhesion rolls, and pressure rolls) and belts for OA equipment (e.g., copiers, printers, faxes); rolls, roll blades, and belts of PPCs; rolls of film processors and X-ray film processors; printing rolls, scrapers, tubes, valve parts, and belts of printing equipment; ink tubes, rolls, and belts of printers; application rolls, scrapers, tubes, and valve parts of application or coating equipment; processing rolls, gravure rolls, guide rolls, guide rolls of coating lines for manufacturing of magnetic tapes, gravure rolls of coating lines for manufacturing of magnetic tapes, and coating rolls.

In the field of food machinery (e.g., food plant equipment and household items), the molded article may be used in steps of food production, food transportation, and food storage.

Specific examples of applications in the field of food machinery include seals of plate-type heat exchangers, solenoid valve seals of vending machines, packings of thermo pots, sanitary pipe packings, packings of pressure cookers, seals of boilers, gaskets for heat exchangers, diaphragms and packings for food processing equipment, rubber materials (e.g., seals such as heat exchanger gaskets, diaphragms, and O-rings, pipes, hoses, sanitary packings, valve packings, packings for filling used as joints between the mouth of a container (e.g., a bottle) and a filler) for food processing equipment. The molded article may also be used as packings, gaskets, tubes, diaphragms, hoses, and joint sleeves used for products such as alcohols and soft drinks, filling devices, food sterilizers, brewing devices, boilers, and food vending machines.

In the field of equipment for nuclear power plants, the molded article may be used as, for example, any of check valves and reducing valves around reactors and seals of devices for concentration of uranium hexafluoride.

Specific examples of applications in the field of general industry include seal materials for hydraulic devices such as machine tools, construction machinery, and hydraulic machines; seals and bearing seals of hydraulic, lubricating machinery; seal materials used in mandrels; seals used for windows of dry cleaning devices; seals and (vacuum) valve seals of cyclotrons, seals of proton accelerators, seals of automatic wrapping machines, diaphragms of pumps for analyzers (air pollution monitoring devices) for sulfurous acid gas or chlorine gas in the air, snake pump lining, rolls and belts of printers, belts (conveyor belts) for transportation, squeeze rolls for pickling of sheet steel, cables of robots, solvent squeezing rolls in aluminum rolling lines, O-rings of couplers, acid-resistant cushioning material, dust seals and lip rubbers of sliding portions of cutting machinery, gaskets of garbage incinerators, friction materials, metal or rubber surface modifiers, and covering materials. The molded article may also be used as gaskets and seal materials of devices used in papermaking processes, sealing agents of filter units for cleanrooms, sealing agents for construction, protective coatings for concrete and cement, glass cloth impregnating materials, processing aids for polyolefins, moldability improving additives for polyethylene, fuel containers of small generators and lawn mowers, and pre-coated metals prepared by primer-treating metal plates. The perfluoroelastomer composition may also be permeated into fabrics and then sintered, so that the resulting workpieces may be used as sheets or belts.

Specific examples of applications in the field of steel include sheet steel processing rolls of sheet steel processing equipment.

Specific examples of applications in the field of electrics include insulating oil caps of Shinkansen, venting seals of liquid-immersed transformers, seals of transformers, jackets of oil well cables, seals of ovens (e.g., electric furnaces), window frame seals of microwave ovens, seal materials used in bonding wedges and necks of CRTs, seal materials of halogen lamps, fixing agents for electric parts, seal materials for treating terminals of sheathed heaters, and seal materials used in insulating and damp-proofing treatment on wire terminals of electrical devices. The molded article may also be used as a covering material for oil- and heat-resistant electric wires, highly heat-resistant electric wires, chemical-resistant electric wires, highly insulating electric wires, high voltage power lines, cables, electric wires used in geothermal power generation devices, and electric wires used around automobile engines. The molded article may also be used as any of oil seals and shaft seals of cables for vehicles. The molded article may also be used as any of electrically insulating materials (e.g., materials used for insulating spacers of electric devices, insulating tapes used at joints and ends of cables, and heat-shrinkable tubes) and materials for electric and electronic devices used in high-temperature atmosphere (e.g., lead wire materials for motors and electric wire materials used around high-temperature furnaces). The molded article may also be used as any of sealing layers and protecting films (back sheets) of solar cells.

In the field of fuel cells, the molded article may be used as, for example, any of seal materials between electrodes or between an electrode and a separator in polymer electrolyte fuel cells and phosphoric acid salt fuel cells, and seals, packings, and separators of pipes for hydrogen, oxygen, or generated water.

In the field of electronic parts, the molded article may be used as, for example, any of heat-radiating materials, electromagnetic-wave-shielding materials, and gaskets for hard disk drives (magnetic recording devices) of computers. The molded article may also be used as shock-absorbing rubbers (crash stoppers) of hard disk drives, binders for electrode active materials of nickel hydrogen secondary batteries, binders for active materials of lithium ion batteries, polymer electrolytes of lithium secondary batteries, binders for positive electrodes of alkaline storage batteries, binders for EL elements (electroluminescent elements), binders, seal materials, and sealing agents for electrode active materials of capacitors, covering materials for quartz of optical fibers, films and sheets such as covering materials for optical fibers, potting, coating, or bonding seals for electronic parts and circuit boards, fixing agents for electronic parts, modifiers for seal materials (e.g., epoxy compounds), coatings for printed circuit boards, modifiers for printed circuit board prepreg resins (e.g., epoxy compounds), scattering inhibitors for electric light bulbs, gaskets for computers, large computer cooling hoses, packings such as gaskets and O-rings for secondary batteries, especially lithium secondary batteries, sealing layers, connectors, and dampers covering one or both of outside surfaces of organic EL structures.

In the field of equipment for transporting chemicals, the molded article may be used as, for example, any of safety valves and loading valves of trucks, trailers, tank trucks, and shipping.

In the field of parts of equipment for prospecting and mining energy sources such as petroleum and gas, the molded article may be used as, for example, any of seal materials used in mining petroleum or natural gas and boots of electric connectors used in oil wells.

Specific examples of applications in the field of parts of equipment for prospecting and mining energy sources include drill bit seals, pressure-control diaphragms, seals of horizontal drilling motors (stators), stator bearing (shaft) seals, seal materials used in blowout preventers (BOP), seal materials used in rotary blowout preventers (pipe wipers), seal materials and gas-liquid connectors used in measurement while drilling systems (MWD), logging tool seals (e.g., O-rings, seals, packings, liquid-gas connectors, and boots) used in logging equipment, expandable packers and completion packers, and packer seals used therefor, seals and packings used in cementing devices, seals used in perforators (perforating devices), seals, packings, and motor linings used in mud pumps, covers of underground sound inspection devices, U-cups, composition seating cups, rotary seals, laminate elastomeric bearings, seals for flow control, seals for sand control, seals of safety valves, seals of hydraulic fracturing equipment, seals and packings of linear packers and linear hangers, seals and packings of well heads, seals and packings of chokes and valves, seal materials for logging while drilling (LWD) systems, diaphragms (e.g., diaphragms for feeding lubricants in petroleum mining pits) used in prospecting and mining petroleum, gate valves, electronic boots, and seal elements of perforating guns.

The molded article may also be used as for example, any of joint seals in kitchens, bathrooms, and lavatories; fabrics of outdoor tents; seal materials for materials of stamps; rubber hoses for gas heat pumps and Freon-resistant rubber hoses; films, linings, and weather-resistant covers for agriculture; and tanks of laminated sheet steel used in the field of construction or home appliances.

The molded article may also be used as an article bonded to a metal such as aluminum. Examples of such applications include door seals, gate valves, pendulum valves, and solenoid tips, as well as piston seals and diaphragms bonded to metal and metal rubber parts such as metal gaskets bonded to metal.

The molded article may also be used as any of rubber parts, brake shoes, and brake pads of bicycles.

One exemplary form of the molded article is a belt. Such a belt is also useful.

Examples of the belt include the following: power transmission belts (including flat belts, V-belts, V-ribbed belts, toothed belts), and transportation belts (conveyor belts) such as flat belts used for portions exposed to high temperatures, such as portions around engines of agricultural machinery, machine tools, and industrial machinery; conveyor belts for transporting scattered matters or particles of coal, smashed rock, earth and sand, ores, and wood chips at high temperatures; conveyor belts used in iron mills, such as blast furnaces; conveyor belts used for applications exposed to high temperatures in high precision machine assembling factories and food factories; V-belts and V-ribbed belts for agricultural machinery, general equipment (e.g., OA equipment, printers, dryers for business purposes), and automobiles; power transmission belts of transporting robots; toothed belts such as power transmission belts of food machinery and machine tools; and toothed belts for automobiles, OA equipment, medical uses, and printers.

In particular, timing belts are typical toothed belts for automobiles.

The above belt may have a single layer structure or a multi-layer structure.

In the case of a multi-layer structure, the belt may have a layer obtained by crosslinking the cross-linkable composition and a layer of another material.

Examples of the layer of another material in the multi-layer belt include layers formed from different rubber, layers formed from thermoplastic resin, fiber-reinforced layers, canvas layers, and metal foil layers.

The molded article may also be used as damper pads for industrial use, damper mats, slab mats for railways, pads, and damper rubbers for automobiles. The damper rubbers for automobiles may be damper rubbers for engine mounts, motor mounts, member mounts, strut mounts, bushes, dampers, muffler hangers, and center bearings.

Examples of other applications include joint parts such as flexible joints and expansion joints, boots, and grommets. In the field of shipping, the molded article may be used for marine pumps.

The joint parts are joints used for pipes and piping equipment, and are used for preventing vibrations and noises generated by piping systems, absorption of expansion and contraction or displacement due to temperature change and pressure change, absorption of dimensional changes, and mitigation or prevention of influences due to earthquakes or land subsidence.

The flexible joints and expansion joints may be preferably used as molded articles with complicated shapes for shipbuilding piping, piping of machinery such as pumps and compressors, chemical plant piping, electric piping, piping of civil engineering works and waterworks, and automobiles.

The boots may be preferably used as molded articles with complicated shapes, such as boots for various industries, including boots for automobiles (e.g., constant-velocity joint boots, dust covers, rack and pinion steering boots, pin boots, and piston boots), boots for agricultural machinery, boots for industrial vehicles, boots for construction machinery, boots for hydraulic machinery, boots for pneumatic machinery, boots for centralized lubrication systems, boots for liquid transportation, boots for firefighting, and boots for liquefied gas transportation.

The molded article may also be used as any of diaphragms for filter presses, diaphragms for blowers, diaphragms for water supply, diaphragms for liquid storage tanks, diaphragms for pressure switches, diaphragms for accumulators, and diaphragms for air springs (e.g., suspensions).

Addition of the molded article to rubber or resin enables production of slip inhibitors capable of providing molded articles and coats which are less likely to cause slippage in environments where the articles or coats become wet by moisture such as rain, snow, ice, or sweat.

The molded article may also be used as a cushioning material for heat-press molding in production of decorative plywood, printed circuit boards, electrically insulated plates, and hard polyvinyl chloride laminates from melamine resin, phenol resin, or epoxy resin.

The molded article may also contribute to give impermeability to various supporters such as sealing gaskets related to weapons and protective clothing against contact with invasive chemicals.

The molded article may also be used as any of O-rings (square-rings), V-rings, X-rings, packings, gaskets, diaphragms, oil seals, bearing seals, lip seals, plunger seals, door seals, lip and face seals, gas delivery plate seals, wafer support seals, barrel seals, and other seal materials for sealing lubricants (engine oil, mission oil, gear oil), fuel oils, or greases (in particular, urea grease) containing amine additives (in particular, amine additives used as antioxidants, detergents, or dispersants) used in transports such as automobiles and shipping. The molded article may also be used as any of tubes, hoses, rubber rolls, coatings, belts, and valve bodies of valves. The molded article may also be used as any of laminating materials and lining materials.

The molded article may also be used as any of covering materials for heat- and oil-resistant electric wires used as, for example, electric wires of sensors contacting transmission oil and/or engine oil in internal combustion engines of automobiles and detecting the oil temperature and/or the oil pressure, and may be used in high-temperature environment such as the inside of oil pans of automatic transmissions or engines.

In addition, the molded article may be used with a vulcanized coat formed thereon. Specific examples of such applications include non-viscous oil-resistant rolls for copiers, weather-resistant freeze-preventive weather strips, rubber stoppers for infusion solution, vial rubber stoppers, release agents, non-viscous light-duty transport belts, adhesion-preventive coatings of pulley gaskets of automobile engine mounts, covering processing of synthetic fibers, and bolt parts or joints having a packing covering thin layer.

The applications of the molded article with respect to the automobile-related parts include motorcycle parts having the same configurations.

Examples of the automobile-related fuels include light oil, gasoline, and fuels for diesel engines (including biodiesel fuel).

In addition to the above applications as the molded article, the perfluoroelastomer composition may also be used in various applications in various fields of industry.

The perfluoroelastomer composition may be used as any of surface modifiers for metal, rubber, plastic, or glass; seal materials and covering materials requiring heat resistance, chemical resistance, oil resistance, and non-viscousness, such as metal gaskets and oil seals; and non-viscous covering materials or bleed barriers for rolls for OA equipment and belts for OA equipment, and may be impregnated into or bake-applied to fabric sheets and belts.

If having high viscosity and high concentration, the perfluoroelastomer composition may be formed into any of seal materials, linings, and sealants having more complicated shapes by a usual method. If having low viscosity, the perfluoroelastomer composition may be formed into thin films of several micrometers. If having middle viscosity, the perfluoroelastomer composition may be applied to any of pre-coated metals, O-rings, diaphragms, and reed valves.

Further, the perfluoroelastomer composition may be applied to any of rolls or belts for transporting fabric or paper, printing belts, chemical-resistant tubes, drug stoppers, and fuel hoses.

Examples of base materials to be covered with the perfluoroelastomer composition include metals such as iron, stainless steel, copper, aluminum, and brass; glass products such as glass plates and woven or nonwoven fabric of glass fiber; molded articles of or articles covered with general-purpose or heat-resistant resin (e.g., polypropylene, polyoxymethylene, polyimide, polyamide imide, polysulfone, polyether sulfone, and polyether ether ketone); molded articles of or articles covered with general-purpose rubber (e.g., SBR, butyl rubber, NBR, EPDM) or heat-resistant rubber (e.g., silicone rubber, fluororubber); and woven or nonwoven fabric of natural or synthetic fiber.

The covered articles formed from the perfluoroelastomer composition may be used in the fields requiring heat resistance, solvent resistance, lubrication, and non-viscousness. Specific examples of applications thereof include rolls (e.g., fixing rolls, pressing rolls) and transporting belts for OA equipment (e.g., copiers, printers, faxes); sheets and belts; O-rings, diaphragms, chemical-resistant tubes, fuel hoses, valve seals, gaskets for chemical plants, and engine gaskets.

The perfluoroelastomer composition may be dissolved in a solvent and then used as a coating or an adhesive. The perfluoroelastomer composition may also be used as a coating in the form of emulsion dispersion (latex).

The composition may be used as any of seal materials and linings for various devices and pipes, and as any of surface-treating agents for structures formed of an inorganic or organic substrate such as metal, ceramic, glass, stone, concrete, plastic, rubber, wood, paper, or fiber.

The composition may be applied to any of the above substrates using a dispenser or by screen printing.

The perfluoroelastomer composition may be used as a coating composition for casting a film or for immersing a substrate such as fabric, plastic, metal, or elastomer.

In particular, the perfluoroelastomer composition in the form of latex may be used for production of covered fabric, protective gloves, impregnated fibers, covers for O-rings, covers for quick connecting O-rings for fuel systems, covers for fuel system seals, covers for fuel tank rollover valve diaphragms, covers for fuel tank pressure sensor diaphragms, covers for oil filter and fuel filter seals, covers for fuel tank sender seals and for sender head fitting seals, covers for rolls of fixing mechanisms of copiers, and polymer coating compositions.

These compositions are useful for covering silicone rubber, nitrile rubber, and other elastomers. In order to improve the heat stability thereof, as well as the permeation resistance and chemical resistance of substrate elastomers, these compositions are useful for covering parts produced from such elastomers. Examples of other applications include coverings for heat exchangers, expansion joints, vats, tanks, fans, flue ducts, and other ducts, and housing structures (e.g., concrete housing structures). The composition may be applied to exposed cross sections of multi-layer parts in, for example, a production method for hose-like structures or diaphragms. Sealing materials at jointing portions and bonding portions are often formed of hard material, and the perfluoroelastomer composition provides improved frictional interfaces and improved dimension interference fit with a reduced, slight amount of leakage along the sealed surface. The latex thereof improves the seal durability in applications of various automobile systems.

These materials can be used in production of power steering systems, fuel systems, and air conditioning systems, and any bonding portions where hoses and tubes are bonded to other parts. The composition shows its usefulness in repair of production defects (and damages due to use) in multi-layer rubber structures such as tri-layer fuel hoses. The composition is also useful for application to thin sheet steel which may be formed or embossed before or after the application of the coating. For example, multiple layers of covered steels may be assembled and a gasket may be disposed between two rigid metal parts. The sealing effect can be achieved by applying the perfluoroelastomer composition to between the layers. This process may be used for producing engine head gaskets and exhaust manifold gaskets so as to decrease the bolt force and strain of assembled parts, while providing good saving and low release of fuel owing to little cracking, bending, and hole deformation.

The perfluoroelastomer composition may also be used as coatings; substrate-integrated gaskets and packings formed by dispenser-molding the composition to substrates including inorganic materials such as metal or ceramic; and multi-layer articles prepared by covering substrates including inorganic materials such as metal or ceramic.

EXAMPLES

The present invention will be described referring to, but should not be limited to, examples.

The values in the examples were determined by the following methods.

(Number of Perfluoroelastomer Particles in Aqueous Dispersion)

This number was calculated by the following formula:

$$\text{Number of polymer particles} = \left\{\frac{\text{Solid content of aqueous dispersion(mass \%)}}{100 - (\text{Solid content of aqueous dispersion(mass \%)})}\right\} / \left\{\frac{4}{3} \times 3.14 \times \left(\frac{\text{Average particle size(nm)}}{2} \times 10^{-9}\right)^3 \times \text{specific gravity} \times 10^6\right\}$$

wherein the number of polymer particles (number of perfluoroelastomer particles) is a value per 1 cc of water, and the specific gravity is a measured value of the specific gravity of the perfluoroelastomer synthesized.

(Specific Gravity)

The specific gravity was determined using an automatic specific gravity meter DMA-220H (Shinko Denshi Co., Ltd.).

(Polymerization Rate)

The polymerization rate was calculated by the following formula:

Polymerization rate={(weight of aqueous dispersion)×(solid content)/100}/[{(amount of pure water used in polymerization)+(amount of water contained in fluorosurfactant aqueous solution used in polymerization)}×polymerization time].

The units of the respective values in the formula are as follows:

Weight of aqueous dispersion: g
Solid content: mass %
Amount of pure water used in polymerization: kg
Amount of water contained in fluorosurfactant aqueous solution used in polymerization: kg
Polymerization time: h
Polymerization rate: g/(h×kg).

(Volume Average Particle Size)

The volume average particle size was determined by dynamic light scattering. The aqueous dispersion obtained by polymerization was diluted 10 fold with pure water to prepare an aqueous dispersion for particle size measurement. Then, the volume average particle size was determined from 70 measurement processes using ELSZ-1000S (Otsuka Electronics Co., Ltd.) at 25° C. The refractive index of solvent (water) was 1.3328 and the viscosity of the solvent was 0.8878. The average value of the volume distribution was defined as the particle size.

(Glass Transition Temperature of Perfluoroelastomer)

First, 10 mg of a sample was heated at a temperature-increasing rate of 10° C./min using a differential scanning calorimeter (DSC822e, Mettler-Toledo International Inc.) so that a DSC curve was obtained. Then, the peak-top temperature on the differential curve regulated in JIS K6240 was defined as the glass transition temperature.

(Solid Content)

First, 1 g of the aqueous dispersion was dried in a fan dryer at 150° C. for 12 hours. Then, the ratio in percentage of the mass of the residue after heating to the mass (1 g) of the aqueous dispersion was used as the solid content.

(Monomer Unit Composition of Perfluoroelastomer)

The monomer unit composition of the perfluoroelastomer was determined by $^{19}$F-NMR. Since the values were rounded, the sum of the amounts of the monomer units is not necessarily 100 mol %.

(Mooney Viscosity)

The Mooney viscosity was determined using a Mooney viscometer MV2000E (Alpha Technologies Inc.) in conformity with JIS K6300.

Example 1 (5 Parts by Mass of $F(CF_2)_5COONH_4$ for 100 Parts by Mass of Water)

(Polymerization)

An aqueous solution was prepared by mixing 2221 g of pure water, 234 g of a 50 mass % aqueous solution of $F(CF_2)_5COONH_4$, and 0.21 g of ammonium carbonate. This aqueous solution was put into a 6-L stainless steel autoclave (equipped with a MAXBLEND model impeller and one baffle) without an ignition source. The inside of the system was sufficiently purged with nitrogen gas and then the air was removed. Then, the temperature was increased up to 52° C. under stirring at 400 rpm, and a gas mixture of tetrafluoroethylene (TFE) and perfluoro(methyl vinyl ether) (PMVE) (TFE/PMVE=35/65 mol %) was put into the autoclave such that the internal pressure reached 0.757 MPa·G. Next, 0.90 g of $CF_2=CFOCF_2CF(CF_3)OCF_2CF_2CN$ (CNVE) was injected with nitrogen pressure, and a solution of 12.3 g of ammonium persulfate (APS) dissolved in 30 g of water was injected with nitrogen, so that the reaction was started.

Since the pressure inside the tank decreased while the polymerization proceeded, 7 g of TFE and 8 g of PMVE were introduced into the autoclave when the pressure reached 0.662 MPa·G so as to increase the pressure. Since the pressure inside the tank decreased while the reaction proceeded, TFE and PMVE at a ratio of 60/40 mol % were injected so that the pressure increase and the pressure decrease were repeated within the range of 0.662 MPa·G to 0.76 MPa·G. Until the finish of the polymerization, 326 g in total of TFE and 361 g in total of PMVE, including the aforementioned TFE 7 g and PMVE 8 g, were injected. During the polymerization, 17 portions of CNVE each in an amount of 0.90 g together with 2 g of water were injected as intermediate additions into the polymerization tank. The xth ($1 \leq x \leq 17$) intermediate addition of CNVE was performed when the total amount of TFE added exceeded $\{(326/18) \times x\}$ g.

After TFE, PMVE, and CNVE were put into the polymerization tank as mentioned above and the pressure inside the polymerization tank reached 0.76 MPa·G, unreacted monomers were released while the autoclave and the reaction solution in the tank were immediately cooled down. Thereby, 3251 g of an aqueous dispersion with a solid content of 21.7 mass % was obtained. The polymerization time (from the time when ammonium persulfate was put into the tank to the time when the release of unreacted monomers was started) was 14.0 hours. No polymer was left attached to the inside of the autoclave, such as the impeller, the inside wall, and the baffle, after the aqueous dispersion was taken out.

(Aftertreatment of Aqueous Perfluoroelastomer Dispersion)

First, 900 g of the resulting aqueous dispersion was mixed and diluted with 900 g of pure water. This diluted mixture was dropwise added to 7500 g of a 3.5% hydrochloric acid. The dropwise addition of the mixture was performed under stirring of the hydrochloric acid. Since the polymer was coagulated in the hydrochloric acid, this coagulated polymer was filter-collected and put into 10000 g of pure water. Then, the polymer was washed therein under stirring for 10 minutes. Ten minutes later, the polymer was again filter-collected, put into 10000 g of pure water, and washed therein under stirring for 10 minutes. This washing operation in 10000 g of pure water was repeated 6 times, and then the polymer was filter-collected. The polymer filter-collected was dried in vacuo at 70° C. for 60 hours. Thereby, a white polymer was obtained.

(Analysis of Perfluoroelastomer)

The $^{19}$F-NMR (solid-state NMR) analysis found that the dried polymer had a monomer unit composition of TFE/PMVE/CNVE=54.5/45.1/0.43 mol %. The Mooney viscosity ML(1+20) at 170° C. was 59.

The glass transition temperature was −3.4° C.

The DTA measurement from room temperature to 600° C. and the DSC measurement from −50° C. to 100° C. found no melting peak.

The polymerization rate calculated by the above formula was 21.6 g/(h×kg).

The volume average particle size of the perfluoroelastomer particles in the aqueous dispersion was 67.4 nm.

The number of the perfluoroelastomer particles in the aqueous dispersion calculated by the above formula was $8.5 \times 10^{14}$ per cc. The specific gravity of the polymer was 2.038.

Example 2 (10 Parts by Mass of $F(CF_2)_5COONH_4$ for 100 Parts by Mass of Water)

The polymerization was performed in the same manner as in Example 1 except that the amount of pure water initially added was changed to 2104 g and the amount of the 50 mass % aqueous solution of $F(CF_2)_5COONH_4$ was changed to 468 g. Thereby, 3389 g of an aqueous dispersion with a solid content of 21.2 mass % was obtained. The polymerization time was 7.10 hours. No polymer was left attached to the inside of the autoclave, such as the impeller, the inside wall, and the baffle, after the aqueous dispersion was taken out.

The resulting aqueous dispersion was subjected to aftertreatment in the same manner as in Example 1, and thereby a white polymer was obtained. The resulting polymer was analyzed in the same manner as in Example 1, and the following results were obtained.

Monomer unit composition of polymer: TFE/PMVE/CNVE=54.7/44.8/0.45 mol %

Mooney viscosity ML(1+20) at 170° C.: 99.5

Glass transition temperature: −2.7° C.

The DTA measurement from room temperature to 600° C. and the DSC measurement from −50° C. to 100° C. found no melting peak.

The polymerization rate was 43.2 g/(h×kg), the volume average particle size of the perfluoroelastomer particles in the aqueous dispersion was 23.8 nm, and the number of the perfluoroelastomer particles in the aqueous dispersion was $1.9 \times 10^{16}$ per cc. The specific gravity of the polymer was 2.038.

Example 3 (20 Parts by Mass of $F(CF_2)_5COONH_4$ for 100 Parts by Mass of Water)

The polymerization was performed in the same manner as in Example 1 except that the amount of pure water initially added was changed to 1871 g and the amount of the 50 mass % aqueous solution of $F(CF_2)_5COONH_4$ was changed to 935 g. Thereby, 3651 g of an aqueous dispersion with a solid content of 20.63 mass % was obtained. The polymerization time was 5.93 hours. No polymer was left attached to the inside of the autoclave, such as the impeller, the inside wall, and the baffle, after the aqueous dispersion was taken out.

The resulting aqueous dispersion was subjected to aftertreatment in the same manner as in Example 1, and thereby a white polymer was obtained. The resulting polymer was analyzed in the same manner as in Example 1, and the following results were obtained.

Monomer unit composition of polymer: TFE/PMVE/CNVE=55.0/44.6/0.40 mol %

Mooney viscosity ML(1+20) at 170° C.: 89.4

Glass transition temperature: −3.4° C.

The DTA measurement from room temperature to 600° C. and the DSC measurement from −50° C. to 100° C. found no melting peak.

The polymerization rate was 54.3 g/(h×kg), the volume average particle size of the perfluoroelastomer particles in the aqueous dispersion was 19.3 nm, and the number of the perfluoroelastomer particles in the aqueous dispersion was $3.4 \times 10^{16}$ per cc. The specific gravity of the polymer was 2.038.

Comparative Example 1 (1 Part by Mass of $F(CF_2)_5COONH_4$ for 100 Parts by Mass of Water))

The polymerization was performed in the same manner as in Example 1 except that the amount of pure water initially added was changed to 2315 g and the amount of the 50 mass % aqueous solution of $F(CF_2)_5COONH_4$ was changed to 46.8 g, but the polymerization hardly proceeded. Within 6 hours 18 minutes (6.3 h) of the polymerization time, only 12 g of TFE and 13 g of PMVE were put into the tank, resulting in a failure in adding TFE, PMVE, and CNVE in the same amounts as in Example 1. Thereby, 2421 g of an aqueous dispersion with a solid content of 1.90 mass % was obtained. No polymer was left attached to the inside of the autoclave, such as the impeller, the inside wall, and the baffle, after the aqueous dispersion was taken out.

The polymerization rate was 3.1 g/(h×kg).

Comparative Example 2 (5 Parts by Mass of $C_3F_7OCF(CF_3)CF_2OCF(CF_3)COONH_4$ for 100 Parts by Mass of Water)

The polymerization was performed in the same manner as in Example 1 except that the amount of pure water initially added was changed to 2338 g and the 50 mass % aqueous solution of $F(CF_2)_5COONH_4$ was changed to 116.9 g of 100% (pure) $C_3F_7OCF(CF_3)CF_2OCF(CF_3)COONH_4$. Thereby, 3257 g of an aqueous dispersion with a solid content of 22.0 mass % was obtained. The polymerization time was 5.35 hours. No polymer was left attached to the inside of the autoclave, such as the impeller, the inside wall, and the baffle, after the aqueous dispersion was taken out.

The polymerization rate was 57.4 g/(h×kg).

The resulting aqueous dispersion was subjected to after-treatment in the same manner as in Example 1, and thereby a white polymer was obtained. The resulting polymer was analyzed in the same manner as in Example 1, and the following results were obtained.

Monomer unit composition of polymer: TFE/PMVE/CNVE=57.1/42.5/0.42 mol %

Comparative Example 3 (1 Part by Mass of $C_3F_7OCF(CF_3)CF_2OCF(CF_3)COONH_4$ for 100 Parts by Mass of Water)

The polymerization was performed in the same manner as in Example 1 except that the amount of pure water initially added was changed to 2338 g and the 50 mass % aqueous solution of $F(CF_2)_5COONH_4$ was changed to 23.4 g of 100% (pure) $C_3F_7OCF(CF_3)CF_2OCF(CF_3)COONH_4$. Thereby, 3128 g of an aqueous dispersion with a solid content of 22.4 mass % was obtained. The polymerization time was 7.53 hours. The polymer was left attached to the inside of the autoclave, such as the impeller, the inner wall, and the baffle, after the aqueous dispersion was taken out. The polymer left attached was collected and heated so as to remove the moisture. The amount of the residue was 11.8 g.

The resulting aqueous dispersion was subjected to after-treatment in the same manner as in Example 1, and thereby a white polymer was obtained. The resulting polymer was analyzed in the same manner as in Example 1, and the following results were obtained.

Monomer unit composition of polymer: TFE/PMVE/CNVE=56.0/43.7/0.38 mol %

Mooney viscosity ML(1+20) at 170° C.: 107.0

Glass transition temperature: −2.1° C.

The DTA measurement from room temperature to 600° C. and the DSC measurement from −50° C. to 100° C. found no melting peak.

The polymerization rate was 39.9 g/(h×kg), the volume average particle size of the perfluoroelastomer particles in the aqueous dispersion was 27.0 nm, and the number of the perfluoroelastomer particles in the aqueous dispersion was $1.38 \times 10^{16}$ per cc. The specific gravity of the polymer was 2.038.

Comparative Example 4 (5 Parts by Mass of $F(CF_2)_7COONH_4$ for 100 Parts by Mass of Water)

The polymerization was performed in the same manner as in Example 1 except that the amount of pure water initially added was changed to 1870 g and the 50 mass % aqueous solution of $F(CF_2)_5COONH_4$ was changed to 584.5 g of a 20 mass % aqueous solution of $F(CF_2)_7COONH_4$. Thereby, 3280 g of an aqueous dispersion with a solid content of 22.2 mass % was obtained. The polymerization time was 4.55 hours. No polymer was left attached to the inside of the autoclave, such as the impeller, the inside wall, and the baffle, after the aqueous dispersion was taken out.

The resulting aqueous dispersion was subjected to after-treatment in the same manner as in Example 1, and thereby a white polymer was obtained. The resulting polymer was analyzed in the same manner as in Example 1, and the following results were obtained.

Monomer unit composition of polymer: TFE/PMVE/CNVE=57.1/42.5/0.38 mol %

The polymerization rate was 68.4 g/(h×kg), the volume average particle size of the perfluoroelastomer particles in the aqueous dispersion was 17.0 nm, and the number of the perfluoroelastomer particles in the aqueous dispersion was $5.4 \times 10^{16}$ per cc. The specific gravity of the polymer was 2.038.

Comparative Example 5 (1 Part by Mass of $F(CF_2)_7COONH_4$ for 100 Parts by Mass of Water)

The polymerization was performed in the same manner as in Example 1 except that the amount of pure water initially added was changed to 2242.8 g and the 50 mass % aqueous solution of $F(CF_2)_5COONH_4$ was changed to 119 g of a 20 mass % aqueous solution of $F(CF_2)_7COONH_4$. Thereby, 3130 g of an aqueous dispersion with a solid content of 22.3 mass % was obtained. The polymerization time was 7.40 hours. The polymer was left attached to the inside of the autoclave, such as the impeller, the inner wall, and the baffle, after the aqueous dispersion was taken out. The polymer left attached was collected and heated so as to remove the moisture. The amount of the residue was 9.8 g.

The resulting aqueous dispersion was subjected to after-treatment in the same manner as in Example 1, and thereby a white polymer was obtained. The resulting polymer was analyzed in the same manner as in Example 1, and the following results were obtained.

Monomer unit composition of polymer: TFE/PMVE/CNVE=56.5/43.1/0.40 mol %

Mooney viscosity ML(1+20) at 170° C.: 102.5

The polymerization rate was 40.3 g/(h×kg), the volume average particle size of the perfluoroelastomer particles in the aqueous dispersion was 26.8 nm, and the number of the perfluoroelastomer particles in the aqueous dispersion was $1.40 \times 10^{16}$ per cc. The specific gravity of the polymer was 2.038.

Even when the amount of $C_3F_7OCF(CF_3)CF_2OCF(CF_3)COONH_4$ was increased from 1 part by mass to 5 parts by mass for 100 parts by mass of water, the polymerization rate increased only by about 1.4 times. Also, even when the amount of $F(CF_2)_7COONH_4$ was increased from 1 part by mass to 5 parts by mass for 100 parts by mass of water, the polymerization rate increased only by about 1.7 times. In contrast, when the amount of $F(CF_2)_5COONH_4$ was increased from 1 part by mass to 5 parts by mass for 100 parts by mass of water, the polymerization rate greatly increased by about 7 times.

The invention claimed is:

1. A method for producing an aqueous perfluoroelastomer dispersion containing perfluoroelastomer particles, which process comprises emulsion-polymerizing a perfluoromonomer in an aqueous medium in the presence of a fluorosurfactant in an amount of 2 parts by mass or more for 100 parts by mass of the aqueous medium and represented by the following formula (1):

$$X-(CF_2)_{m1}-Y \quad (1)$$

wherein X is H or F; m1 is an integer of 3 to 6; and Y is —SO$_3$M, —SO$_4$M, —SO$_3$R, —SO$_4$R, —COOM, —PO$_3$M$_2$, or —PO$_4$M$_2$, where M is H, NH$_4$, or an alkali metal; and R is a C1-C12 alkyl group,
wherein the perfluoroelastomer has a glass transition temperature of 20° C. or lower and has a melting peak (ΔH) of 4.5 J/g or lower or no melting peak and is at least one selected from the group consisting of the following copolymer (i)-(iv):

(i) a tetrafluoroethylene (TFE)/perfluoro(methyl vinyl ether) (PMVE) copolymer wherein the composition thereof is (45 to 90)/(10 to 55) (mol %),
(ii) a copolymer of TFE/PMVE/monomer that gives a crosslinking site wherein the composition thereof is (45 to 89.9)/(10 to 54.9)/(0.01 to 4) (mol %),
(iii) a copolymer of TFE/C4-C12 fluoromonomer represented by the following formula (10) or (11) wherein the composition thereof is (50 to 90)/(10 to 50) (mol %), and
(iv) a copolymer of TFE/C4-C12 fluoromonomer represented by the following formula (10) or (11)/monomer that gives a crosslinking site wherein the composition thereof is (50 to 89.9)/(10 to 49.9)/(0.01 to 4) (mol %), $$CF_2=CFOCF_2ORf^{101} \quad (10)$$

wherein $Rf^{101}$ is a C1-C6 linear or branched perfluoroalkyl group, a C5-C6 cyclic perfluoroalkyl group, or a C2-C6 linear or branched perfluorooxyalkyl group having 1 to 3 oxygen atoms, and $$CF_2=CFO(CF_2CF(Y^{11})O)_m(CF_2)_nF \quad (11)$$

wherein $Y^{11}$ is a fluorine atom or a trifluoromethyl group; m is an integer of 1 to 4; and n is an integer of 1 to 4; m and n are selected so that the formula (11) has a carbon number of 5-12,
wherein the emulsion polymerization is performed in the absence of a fluorine-containing compound represented by the following formula (2):

$$X-(CF_2)_{m2}-Y \quad (2)$$

(wherein X is H or F; m2 is an integer of 7 or greater; Y is —SO$_3$M, —SO$_4$M, —SO$_3$R, —SO$_4$R, —COOM, —PO$_3$M$_2$, or —PO$_4$M$_2$ (where M is H, NH$_4$, or an alkali metal; and R is a C1-C12 alkyl group)).

2. The production method according to claim 1, wherein the aqueous dispersion containing perfluoroelastomer particles contains $5 \times 10^{14}$ or more perfluoroelastomer particles per cc.

3. A method for producing a perfluoroelastomer comprising
providing a perfluoroelastomer by removing the aqueous medium from the aqueous dispersion containing perfluoroelastomer particles produced by the production method according to claim 1.

* * * * *